United States Patent [19]
Kimura

[11] Patent Number: 5,610,741
[45] Date of Patent: *Mar. 11, 1997

[54] REFLECTION TYPE LIQUID CRYSTAL DISPLAY DEVICE WITH BUMPS ON THE REFLECTOR

[75] Inventor: Naofumi Kimura, Nabari, Japan

[73] Assignee: Sharp Kabushiki Kaisha, Osaka, Japan

[ * ] Notice: The term of this patent shall not extend beyond the expiration date of Pat. No. 5,408,345.

[21] Appl. No.: 321,170

[22] Filed: Oct. 11, 1994

Related U.S. Application Data

[63] Continuation-in-part of Ser. No. 265,511, Jun. 24, 1994, Pat. No. 5,408,345.

[51] Int. Cl.$^6$ .................... G02F 1/1335; G02F 1/1343
[52] U.S. Cl. .................................... 349/113; 349/139
[58] Field of Search ........................... 359/59, 70, 79, 359/87

[56] References Cited

U.S. PATENT DOCUMENTS

| | | | |
|---|---|---|---|
| 4,431,272 | 2/1984 | Yazawa et al. | 359/70 |
| 4,519,678 | 5/1985 | Komatsubara et al. | 359/70 |
| 5,204,765 | 4/1993 | Mitsui et al. | 359/70 |
| 5,210,628 | 5/1993 | Shields et al. | 359/79 |
| 5,408,345 | 4/1995 | Mitsui et al. | 359/87 |
| 5,418,635 | 5/1995 | Mitsui et al. | 359/70 |
| 5,500,750 | 3/1996 | Kanbe et al. | 359/79 |
| 5,521,731 | 5/1996 | Fukuyama et al. | 359/79 |
| 5,526,149 | 6/1996 | Kanbe et al | 359/87 |

FOREIGN PATENT DOCUMENTS

| | | |
|---|---|---|
| 0112417 | 7/1984 | European Pat. Off. . |
| 0234429 | 9/1987 | European Pat. Off. . |
| 0317910 | 5/1989 | European Pat. Off. . |
| 54-37697 | 3/1979 | Japan . |
| 59-19339 | 5/1984 | Japan . |
| 63-127227 | 5/1988 | Japan . |
| 6-75238 | 3/1994 | Japan . |

OTHER PUBLICATIONS

White et al., "New absorptive mode reflective liquid crystal display device", J. Appl Phys., vol. 45, No. 11, Nov. 1974, pp. 4718–4723.

Koizumi et al., "Reflective Multicolor Lcd(II): Improvement in the Brightness"Proceedings of the SID, vol. 29, No. 2, (1988), pp. 157–160.

Nakamura et al., "Electro–optic Properties of Reflection Type LCD", The 18th Liquid Crystal Discussion 30–110, Oct. 2, 1992, pp. 288–289.

Primary Examiner—William L. Sikes
Assistant Examiner—Charles Miller
Attorney, Agent, or Firm—David G. Conlin; George W. Neuner

[57] ABSTRACT

The reflection-type liquid crystal display device has a pair of substrates disposed opposite to each other and a liquid crystal layer interposed therebetween. A plurality of gate bus wirings and source bus wirings are formed on the surface on the liquid crystal layer side of an insulating substrate composing one substrate to be at right angles to each other and maintain the insulation therebetween. A reflection electrode is formed in the rectangular region formed by the crossing of the gate bus wiring with the source bus wiring. The reflection electrode and the gate bus and source bus wirings are connected through a TFT element. The reflection electrode has a bumpy surface, in the peripheral region of which the ratio of the surface area excluding dents to the total surface area of the peripheral portion of the reflection electrode is selected to be in the range of 60 to 100%.

11 Claims, 19 Drawing Sheets

REFLECTION TYPE LIQUID CRYSTAL DISPLAY DEVICE WITH BUMPS ON THE REFLECTOR

This is a continuation-in-part of application Ser. No. 08/265,511 filed on Jun. 24, 1994, now U.S. Pat. No. 5,408,345.

BACKGROUND OF THE INVENTION

1. Field of the Invention

The present invention relates to a reflection type liquid crystal display device for displaying by reflecting the incident light from the outside, which is preferably used as display means of portable information terminal devices, portable word processors, personal computers and so on.

2. Description of the Related Art

Conventionally, liquid crystal display devices are widely employed as display means of information terminal devices such as personal computers, word processors, and electronic pocket notebooks, portable type television apparatuses, and the like. In the case of a liquid crystal display device of black-and-white display image, a TN (twisted nematic)-type liquid crystal display device is used for an electronic apparatus such as an electronic pocket calculator, and an electronic watch in which the amount of information to be displayed is relatively small, and a STN(super twisted nematic)-type liquid crystal device is used for an electronic apparatus such as word processor in which the amount of information to be displayed is relatively large. Both TN-type and STN-type liquid crystal devices need two polarization plates, and the availability factor of the incident light from the outside is 30% or less. For that reason an image displayed in a reflection type liquid crystal display device with a reflection plate becomes relatively dark. Although a back light can be provided in order to more brighten the displayed image, that disadvantageously causes the increase of consumption power and its own weight, which is not suitable for portable electronic apparatuses.

In the case of a color liquid crystal display device, a color filter is usually combined with either of the TN- and STN-type liquid crystal display device. Color displaying in such color liquid crystal display device is realized by an additive color process. Since two polarizing plates are used in the color liquid crystal display device the same as in a black-and-white liquid crystal display device, and accordingly the availability factor of the incident light is low. Additionally, in order to realize color displaying, picture elements are divided in to three fox red, green, and blue colors, the availability factor of the incident light is further lowered due to dividing the picture elements. Besides, in actual display panels the ratio of a region effective for display of one picture element to the picture element region depends on the light availability factor, namely, the light availability factor is lowered as the ratio of the effective region decreases. When a liquid crystal display device is directed to fine displaying, the picture element region is reduced. A region which does not contribute to displaying, for example, a region for switching devices or for wirings for supplying a voltage for displaying, however, has its limits in reducing. As a consequence, the ratio of the effective region becomes lower. For these reasons the brightness of a display image is further lowered in a color liquid crystal display device. For example, the light availability factor is lowered to a few percents. Consequently a back light is required, which is a barrier against lowering the power consumption and decreasing the weight.

In order to solve the problems, research and development for enhancing the light availability factor have been conducted. For example, it is disclosed that a display image with a high brightness and a high contrast ratio can be obtained without a polarizing plate by mixing a dichroism coloring material into the liquid crystal layer and giving a chiral structure to the orientation of liquid crystal molecules, namely, employing the White & Taylor type guest host mode (D. L. White and G. N. Taylor; J. Appl. Phys. 45 No. 114718(1974)). According to the method, the dichroism coloring material is also twist-oriented along the twist-oriented liquid crystal molecules and the light which has entered into such a liquid crystal layer is absorbed by the dichroism coloring material regardless of the polarization directions of the incident light. Thereby black color displaying can be realized. On the other hand, during the application of a voltage, the liquid crystal molecules and the dichroism coloring material are oriented along the direction of an electric field and the incident light passes through the liquid crystal layer. Thereby white color displaying can be realized.

Additionally, for example, a method wherein only one polarizing plate is used was proposed in "the 18th Liquid Crystal Discussion 3D-110(1992)". According to the method, the liquid crystal display device has the structure of polarizing plate/liquid crystal layer/reflection plate or polarizing plate/phase difference plate/liquid crystal layer/reflection plate, and displaying is carried out by phase variations of the light which has entered into the liquid crystal layer. Since only one polarizing plate is used, a relatively bright display image can be obtained.

The two above-mentioned methods make it possible to increase the light availability factor from 30% or less up to about 50%. Additionally, for example, increasing the effective region has been proposed in the Japanese Unexamined patent Publication JP-A 6-75238 (1994) of the present invention's applicant and others.

FIG. 21 is a plan view of one substrate 31 of a reflection-type liquid crystal display device 30 disclosed in said publication, and FIG. 22 is a sectional view of the reflection-type liquid crystal display device 30. A plurality of gate bus wirings 32 function of chromium, tantalum or the like are disposed in parallel with each other on the one substrate having an electrical insulating property (e.g., made of glass) and a gate electrode 33 branches off from the gate bus wirings 32. The gate bus wirings 32 function as scanning lines.

A gate insulating film 34 made of a material such as silicon nitride ($SiN_x$) and silicon oxide ($SiO_x$) is formed on the entire surface of the substrate 31 to envelop the gate bus wirings 32 and gate electrode 33. A semiconductor layer 35 made of, for example, amorphous silicon (hereinafter described as "a-Si"), polycrystal silicon, and cadmium selenide (CdSe) is formed on a gate insulating film 34 above the gate electrode 33. At both ends of the semiconductor layer 35 are formed contact electrodes 41 made of, for example, a-Si. A source electrode 36 made of, for example, titanium, molybdenum, and aluminium is formed to be superposed on one of the contact electrodes 41, and a drain electrode 37 made of, for example, titanium, molybdenum, and aluminium, the same as in the source electrode 36, is formed to be superposed on the other of the contact electrodes 41.

As shown in FIG. 21, a source bus wiring 39 crossing the gate bus wiring 32 via the gate insulating film 34 is connected to the source electrode 36. The gate bus wiring 39 serves as a signal line. The source bus wiring 39 is made of the same metal as that of the source electrode 36. The gate electrode 33, the gate insulating film 34, the semiconductor layer 35, the source electrode 36, and the drain electrode 37 constitutes a thin film transistor (hereinafter described as "TFT") 40, which has the function as a switching element.

An organic insulating film 42 is formed on the entire surface of the substrate 31 to envelop the source bus wiring 39 and TFT 40. A bump 42a having a height H whose top portion is formed to be spherical is formed in the region where a reflection electrode 38 of the organic insulating film 42 is formed, and a contact hole 43 is formed in a predetermined region on the drain electrode 37 of the organic insulating layer 42. In order to solve problems on the formation method of the organic insulating film 42 and on the formation process of the contact hole 43, and in order to prevent the thickness of the liquid crystal layer from becoming ununiform in manufacturing the liquid crystal display device 30, it is preferable that the height H of the bump 42a is 10 μm or less. The thickness of the liquid crystal layer is generally 10 μm or less. The reflection electrode 38 made of aluminium, silver, or the like is formed on the region of the organic insulating film 42 where the bump 42a is to be formed and connected to the drain electrode 47 through the contact hole 43. Additionally an orientation film 44 is formed thereon.

A color filter 46 is formed on the other substrate 45. More specifically, a magenta or green filter 46a is formed on the region opposed to the reflection electrode 38 of the substrate 31 and a black filter 46b is formed on the region not opposed thereto. A transparent electrode 47 made of, for example, ITO (Indium Tin Oxide) is formed on the entire surface of the color filter 46 and additionally an orientation film 48 is formed thereon.

The two substrates 31, 45 are laminated to be opposed to each other so that the reflection electrode 38 and filter 46 of any one of the substrates 31, 45 and those of the other of the substrates 31, 45 overlap each other, respectively, and a liquid crystal is injected between the substrates, whereby the reflection-type liquid crystal display device 30 is completed.

FIG. 23 is a plan view of a substrate 12 comprising a TFT 11 which is used for an active matrix-type liquid crystal device (Japanese Unexamined Patent Application JP-A 6-75238 (1994), and FIG. 24 is a sectional view taken on line X28—X28 of FIG. 23. A plural gate bus wirings 13 made of, for example, chromium and tantalum are disposed in parallel with each other on the substrate 12 made of, for example, glass, having an insulating property and a gate electrode 14 branches off from the gate bus wirings 13. The gate bus wirings 13 serve as scanning lines.

A gate insulating film 15 made of a material such as silicon nitride ($SiN_x$) and silicon oxide ($SiO_x$) is formed on the entire surface of the substrate 12 to envelop the gate electrode 14. A semiconductor layer 16 made of, for example, a-Si is formed on the gate insulating film 15 above the gate electrode 14. At both ends of the semiconductor layer 16 are formed contact layers 17 made of, for example, a-Si. A source electrode 18 is formed to be superposed on one of the contact layers 17, and a drain electrode 19 is formed to be superposed on the other of the contact layers 17. A source bus wiring 23 is formed to cross the gate bus wiring 13 via the gate insulating film 15 and connected to the source electrode 18. The source bus wiring 23 serves as a signal line. The source electrode 14, the gate insulating film 15, the semiconductor layer 16, the contact layer 17, the source electrode 18, and the drain electrode 19 constitute a TFT 11.

Additionally an organic insulating film 20 is formed thereon, which comprises plural bumps 20a and a contact hole 21 on the drain electrode 19. On the organic insulating film 20 is formed a reflection electrode 22 which is connected to the drain electrode 19 through the contact hole 21. Additionally an orientation film is formed on the reflection electrode 22. The two substrates are laminated, in the same manner as that in the substrate 31 as described above, to be opposed to each other, and a liquid crystal is injected between the substrates.

In the examples of FIGS. 21–24, since the reflection electrodes 38, 22 are formed on the organic insulating films 42, 20, the reflection electrodes 38, 22 can be partly superposed on the gate bus wirings 32, 13 and the source bus wirings 39, 23. Consequently, the areas of the reflection electrodes 38, 22 are enlarged and as a result the ratio of effective region for display is increased, which contributes to the enhancement of the light availability factor. A brighter display image can be thus obtained. Additionally, since the reflection electrodes 38, 22 made of a material having a reflection property are formed as picture electrodes and the reflection electrodes 38, 22 are used as reflection plates, the parallax is lowered in comparison with a reflection-type liquid crystal device in which a reflection plate is disposed on the opposite side of the substrates 31, 12 to the liquid crystal layer. It is possible to realize a reflection-type liquid crystal display device where a further bright display image can be obtained by the combination of a liquid crystal display device having such a constitution with the above-mentioned White & Taylor type guest-host-mode.

Although the constitution as shown in FIGS. 21–24 increases the light availability and achieves a bright display image, the following disadvantages exist due to the asperities. More specifically, the bumps 42a, 20a are formed on the surfaces of the organic insulating films 42, 20 and the reflection electrodes 38, 22 are disposed on the organic insulating films 42, 20 having bumps 42a, 20a, respectively.

A metal film to become the reflection electrodes 38, 22 is formed on each entire surface of the organic insulating films 42, 20 and patterned with a predetermined shape, whereby the reflection electrodes 38, 22 are formed. The patterning is carried out by the etching method. In etching, the metal film in an unnecessary region is dissolved and removed by an etchant. At that time, however, the etchant penetrates between the metal films to be left as the reflection electrodes 38, 22 and the organic insulating films 42, 20, respectively. The penetration of the etchant is more remarkable in the edges of the metal films to be left, the larger the interface areas of the metal films and the organic insulating films 42, 20 are. As described above, the apparent interface area becomes larger and the penetration of the etchant becomes more remarkable by forming the bumps 42a, 20a. When the organic insulation film is not firmly coated with the metal film which is formed by the spattering method, the penetration of the etchant becomes remarkable.

When the etchant penetrates between the organic insulation film and the reflection electrode, peeling of the reflection electrodes 38, 22 begins from their edges. The reflection electrodes 38, 22 peeled, the picture elements obtained are imperfect and the display quality is remarkably decreased. Additionally, since the peeled metal film of the reflection electrodes 38, 22 is found in the liquid crystal layer, there is a possibility of short circuit between the other reflection electrodes 38, 22 and the transparent electrodes opposite to the reflection electrodes 38, 22.

In the examples shown in FIGS. 21, 22, the bump 42a is not provided on the surface of the organic insulation film 42 on the wirings 32, 39, in order to prevent the short circuit between the reflection electrode 38 and the gate bus wiring 32 or the source bus wiring 39. The region where the bump 42a is not provided in order to prevent the peeling, however, is not specified.

SUMMARY OF THE INVENTION

An object of the invention is to provide a reflection-type liquid crystal display device which can display a bright image and has no degradation of display quality caused by the peeling of the reflection electrode.

The invention provides a reflection-type liquid crystal display device comprising:

a liquid crystal layer; and a pair of substrates, said liquid crystal layer interposed between the pair of substrates, said pair of substrates disposed opposite to each other, one of the pair of substrates having a light transmitting electrode on the liquid crystal layer side surface thereof, the substrate being light-transmitting, the other of the pair of substrates having a reflection electrode on the liquid crystal layer side surface which reflects light entering from the side of the other of the pair of substrates, and wherein the reflection electrode has a bumpy surface, and the ratio of the surface area excluding bumps or dents to the total surface area of a peripheral portion of the reflection electrode is selected to be in the range of 60 to 100%.

Further, the invention provides a reflection-type liquid crystal display device comprising a liquid crystal layer, and a pair of substrates, said liquid crystal layer interposed between the pair of substrates, said pair of substrates disposed opposite to each other, one of the pair of substrates a light-transmitting common electrode covering almost all of the liquid crystal layer side surface thereof on the liquid crystal layer side surface, the substrate being light-transmitting, the other of the pair of substratrates having on the liquid crystal layer side surface, a plurality of reflection electrodes as picture elements which reflect light entering from the side of the other of the pair of substrates, a distribution electrode which is supplied with a voltage for displaying to be applied to each reflection electrode and a plurality of switching elements for supplying/interrupting the voltage from the distribution electrode to each reflection electrode, and wherein the reflection electrode has a bumpy surface, and the ratio of the surface area excluding bumps or dents to the total surface area of a peripheral portion of the reflection electrode is selected to be in the range of 60 to 100%.

Further, the invention is characterized in that the reflection electrode is rectangular or nearly rectangular, and the ratio of the width of the peripheral portion in a direction parallel to the sides opposite to each other of the reflection electrode to the length of the opposite sides is selected to be in the range of 0.3 to 10%.

Further, the invention is characterized in that the bumps or dents in reflection electrode are irregularly arranged.

Further, the invention is characterized in that the bumps or dents have one type of shape or two or more types of shape differing in size.

Further, the invention is characterized in that the arrangement pattern of the bumps or dents is selected to be identical in each reflection electrode.

Still further, the invention is characterized in that the arrangement patterns of the bumps or dents in the adjacent reflection electrodes are selected to be reverse to each other.

Yet further the invention is characterized in that the reflection electrode and the distribution electrode are formed on the surface of one substrate on the liquid crystal layer side at an interval for maintaining insulation therebetween.

According to the invention, a reflection-type liquid crystal display device comprises a pair of substrates being disposed opposite to each other through a liquid crystal layer, and one of the pair of substrates has a reflection electrode, and the other substrate of the pair of substrates possessing a light transmitting property has a light transmitting electrode on the liquid crystal layer side surface thereof. A portion where the reflection electrode and the light transmitting electrode overlap each other is a picture element for displaying, the light entering from the other light transmitting substrate side is reflected by the reflection electrode.

According to the invention, the reflection-type liquid crystal display device comprises a pair of substrates being disposed opposite to each other through a liquid crystal layer, one of the pair of substrates has a plurality of reflection electrodes, a distribution electrode and a plurality of switching elements, and the other substrate of the pair of substrates possessing a light transmitting property has a light transmitting common electrode on the liquid crystal layer side surface thereof.

In such a reflection-type liquid crystal display device, the reflection electrode has a bumpy surface, and the ratio of the surface area excluding bumps or dents to the total surface area of a peripheral portion of the reflection electrode in the peripheral portion, namely the portion having a predetermined distance from the edge to inside of the reflection electrode surface is selected to be in the range of 60 to 100%. When the ratio is 100%, that means that neither bumps nor dents are found in the peripheral portion. In order to make the reflection electrode surface bumpy, the surface where the reflection electrode is to be formed is made bumpy, a metal film to become a reflection electrode is formed on the entire surface, and thereafter the metal film is patterned, whereby the reflection electrode is formed. The patterning of the metal film is conducted by etching, whereby the unnecessary portion of the metal film is dissolved to be removed.

In the reflection-type liquid crystal display device, relatively a few or no dents or bumps are found in the peripheral portion of the reflection electrode, and consequently also in the portion of the surfaces where the reflection electrode is to be formed, corresponding to the peripheral portion of the reflection electrode are formed relatively a few or no bumps or dents. As a result, the interface between the metal film and the surface where the reflection electrode are to be formed becomes relatively small in the edge portions of the metal film which are remained as a reflection electrode and therefore the penetration amount of etchant penetrated through the interface becomes smaller.

Consequently the reflection electrode can be prevented from peeling from the edges thereof and therefore defective picture elements can be reduced. Additionally, a short circuit due to a peeled electrode is prevented from occurring between the other reflection electrodes and a common electrode opposite to the reflection electrodes.

Further the reflection electrode functions as a reflection plate, whereby the parallax is lowered in comparison with a reflection-type liquid crystal display device in which a reflection plate is disposed on the opposite side to the liquid crystal layer side of one substrate.

It is demonstrated that when the ratio of the surface area excluding bumps or dents to the total surface area of the peripheral portion of the reflection electrode in the peripheral portion is in the range of 60 to 100%, the peeling of the edge portions of the reflection electrode does not occur.

Further according to the invention, the reflection electrode is rectangular or nearly rectangular, the ratio of (i) the dimension of the a peripheral portion on each side of the reflection electrode in a direction from the surface edge toward the inside of the reflection electrode to (ii) the entire dimension of the reflection electrode extending in the same direction is selected to be in the range of 0.3 to 10%. The above mentioned bumps or dents are formed on the peripheral portion having such width.

Further according to the invention, the bumps or dents in one reflection electrode are irregularly arranged. Additionally, it is preferable that the bumps or dents have one type of shape or two or more types of shape differing in size. It is further preferable that the arrangement pattern of the bumps or dents is selected to be identical in each reflection electrode. It is still further preferable that the arrangement patterns of the bumps or dents between the adjacent reflection electrodes are selected to be reverse to each other. Since an identical reflection property is indicated in each picture element, a uniform display image having a high contrast can be achieved.

Yet further according to the invention, the reflection electrode and the distribution electrode are formed on the surface of one substrate on the liquid crystal layer side at an interval for maintaining the insulation therebetween. As described above, even when the reflection electrode and distribution electrode are formed, a reflection-type liquid crystal display device with a relatively bright display image of an excel lent image quality in which the peeling of the reflection electrode never occurs can be manufactured by making the surface of the reflection electrode bumpy.

As described above, according to the invention the reflection electrode has a bumpy surface, where relatively a few or no bumps or dents are formed in the peripheral portion of the reflection electrode having a predetermined length from the edge to inside of the reflection electrode surface. As a result, when the reflection electrode is formed and patterned, the interface between the metal film and the surface where the reflection electrode are to be formed becomes relatively small in the edge portions of the metal film which are remained as a reflection electrode and therefore the penetration amount of etchant penetrated through the interface becomes smaller. Consequently the reflection electrode can be prevented from peeling from the edges thereof and defective picture elements can be avoided. Additionally, since each picture element has an identical reflection property because of the bumpy surface of the reflection electrode, a uniform display image having a high contrast can be achieved. Further the reflection electrode functions as a reflection plate, whereby the parallax is not caused.

Further according to the invention, the bumps or dents in one reflection electrode are irregularly arranged. Additionally, the bumps or dents have one type of shape or two or more types of shape differing in size. The arrangement pattern of the bumps or dents is identical in each reflection electrode. Sill further the arrangement patterns of the bumps or dents between the adjacent reflection electrodes are reverse to each other. Since an identical reflection property is indicated in each picture element, a uniform display image having a high contrast can be achieved.

Yet further according to the invention, although the reflection electrode and the distribution electrode are formed on the surface of one substrate on the liquid crystal layer side at an interval for maintaining the insulation therebetween, nevertheless, a reflection-type liquid crystal display device with a relatively bright display image of an excel lent image quality in which the peeling of the reflection electrode occurs little can be achieved.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1:
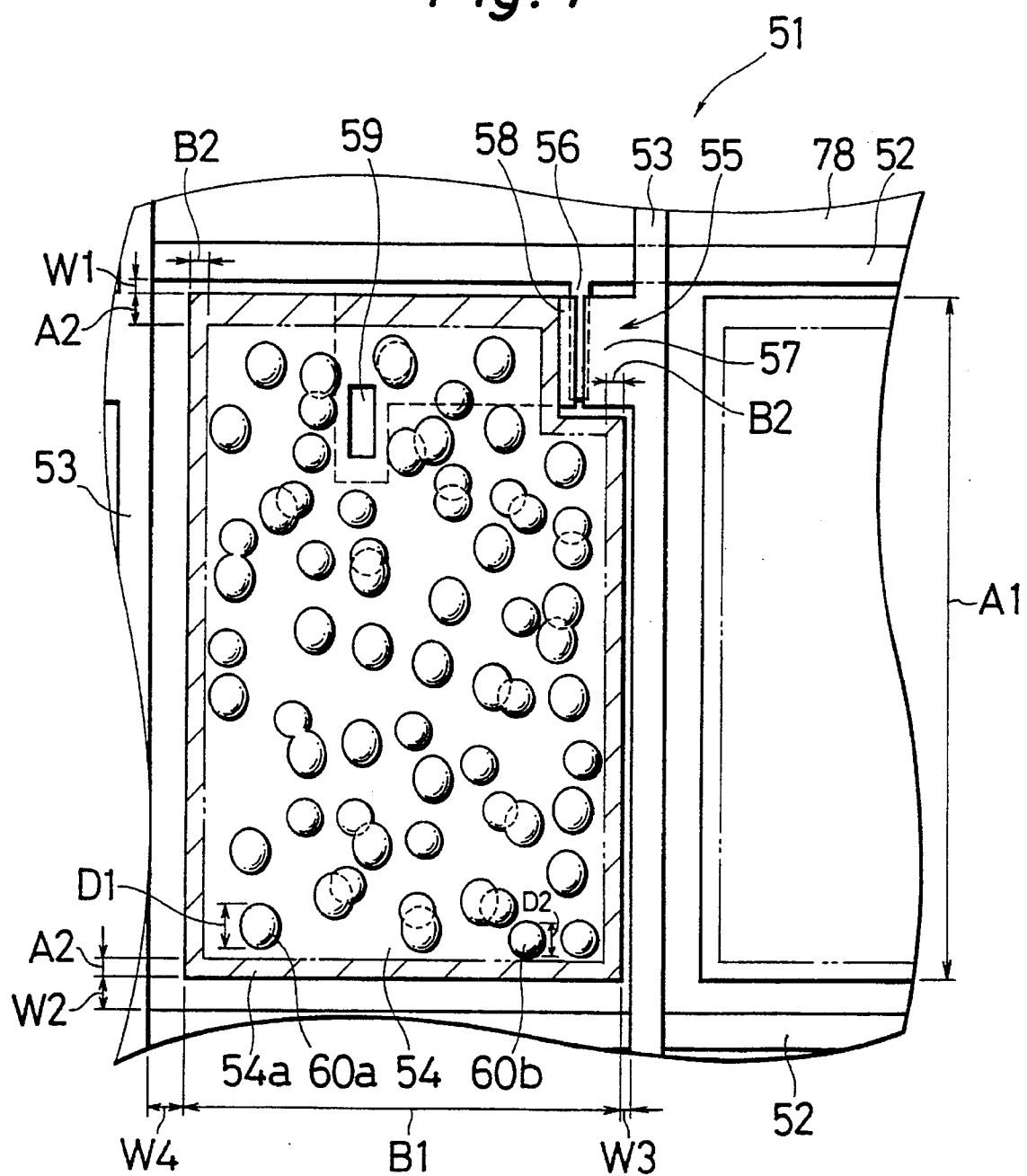
FIG. 1 is an enlarged plan view of one substrate 51 of a pair of substrates of a reflection-type liquid crystal display device 61 of an embodiment of the invention.

Now referring to the drawings, preferred embodiments of the invention are described below.

FIG. 1 is an enlarged plan view of one substrate 51 of a pair of substrates of a reflection-type liquid crystal display device 61 of an embodiment of the invention. The reflection-type liquid crystal display device 61 is comprised of a pair of substrates 51, 71 one of which is light-transmissive, and a liquid crystal layer interposed between the pair of substrates 51, 71.

A plurality of gate bus wirings 52 are provided to be in parallel to each other on an insulating substrate 78 realized by glass or the like. Gate electrodes 56 branch off from the gate bus wirings 52. Additionally a plurality of source bus wirings 53 are provided so as to be orthogonal with and maintain the insulation from the plurality of gate bus wirings 52. Source electrodes 57 branch off from the source bus wirings 53. Reflective electrodes 54 are formed in rectangular regions on one substrate 51 of the pair of substrates 51, 71 which are formed by crossing the plurality of gate bus wirings 52 and the plurality of source bus wirings 53. The reflection electrodes 54 are arranged at intervals W1–W4 in order to maintain the insulation from the gate bus wirings 52 and the source bus wirings 53.

The reflection electrode 54 is connected through a TFT element 55 as a switching element with the gate bus wiring 52 and the source bus wiring 53. The TFT element 55 comprises the gate electrode 55, a source electrode 57, and a drain electrode 58 connected to the reflection electrode 54, and the drain electrode 58 and the reflection electrode 54 are connected through a contact hole 59 as described below.

A plurality of dents 60a, 60b are provided on the surface of the reflection electrode 54, whereby the surface is made bumpy. The plurality of dents 60a, 60b exist on the entire surface of the reflection electrode 54. In a periphery of the reflection electrode 54 which is indicated by oblique lines in FIG. 1, the dents 60a, 60b are formed in the following manner. More specifically, the ratio of the area which is obtained by subtracting the area of the dents 60a, 60b from the total area of the periphery 54a to the total area of the periphery 54a is selected to be in the range of from 60 to 100%. The rate of the example In FIG. 1 is 100%, that is, no dents are formed in the periphery 54a. The periphery 54a means a region having a predetermined distance in a direction from the surface edge to the inside of the reflection electrode 54, and the predetermined distance is indicated by A2, B2.

Additionally, in the embodiment the plurality of dents 60a, 60b are irregularly arranged in one reflection electrode 54 and consists of two types of dents 60a, 60b which are different in size. The plurality of dents may be of one kind, and the invention also includes three or more types of dents which are different in size.

Additionally it is preferable that the depths H of the dents 60a, 60b are 10 μm or less. Since the thickness of the liquid crystal layer is generally 10 μm or less, the irregularity of the depths of the liquid crystal layer can be minimized by selecting the depths to be as mentioned above. In the embodiment, the sizes of the dents 60a, 60b, for example, the maximums of the sectional diameters D1, D2 were 10 and 5 μm, respectively, and the depths H of the dents were 0.6 μm.

Figure 2:
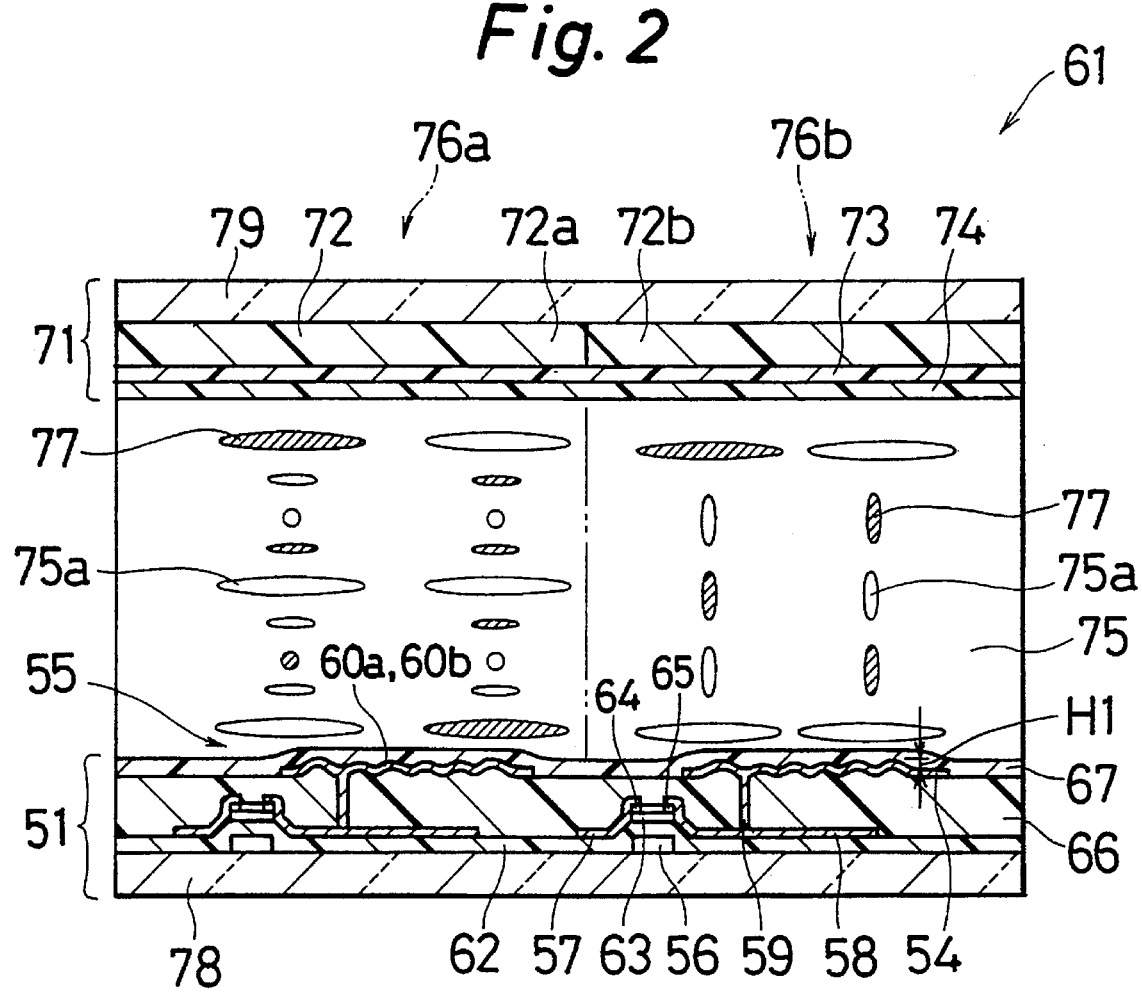
FIG. 2 is a sectional view of the reflection type liquid crystal display device 61.

FIG. 2 is a sectional view of the reflection type-liquid crystal display device 61. Referring to FIG. 2, a method for manufacturing the reflection-type liquid crystal display device 61 will be described. The gate bus wiring 52 and the gate electrode 56 are formed on the insulating substrate 78 made of, for example, glass (e.g., that manufactured by Corning under the trade name "#7059"). In order to form those, for example, a 3000Å thick Ta film is firstly made on the entire surface of the insulating substrate by the spattering method and secondly the Ta film is patterned by the etching or photolithograph method.

Next the gate insulating film 62 is formed to envelop the gate bus wiring 52 and the gate electrode 56. The film 62 is made, for example, by forming a 4000Å thick SiNx film by the plasma CVD (Chemical Vapor Deposition) method. Alternatively, a $Ta_2O_5$ film may be formed by anodize oxidation of the gate bus wiring 52 and the gate electrode 56 in order to make the gate bus wiring 52 and the gate electrode 56. In the embodiment, a SiNx film, a 1000Å thick a-Si layer, and a 400Å thick $n^+$ type a-Si layer were continuously formed by the plasma CVD method in this order. The a-Si layer and the $n^+$ type a-Si layer are simultaneously patterned. As a result a semiconductor layer 63 is formed by the a-Si layer and contact layers 64, 65 are formed by the $n^+$ type a-Si layer.

Subsequently, a 2000Å thick Mo film is formed on the insulating substrate 78 to envelop those members formed in the above-mentioned manner and then the Mo film is patterned to form a source bus wiring 53, a source electrode 57 and a drain electrode 58. In such a manner, a TFT element 55 is manufactured.

On the entire surface of the insulating substrate 78 in which the TFT element 55 was formed is formed an organic insulating film 66 having a bumpy surface in the below-mentioned manner. Further the reflection electrode 54 is formed on the organic insulating film 66. The surface of the reflection electrode 54 becomes also bumpy due to the asperities of the surface of the organic insulating film 66. Consequently, dents corresponding to the above-mentioned dents 60a, 60b of the reflection electrode 54 are formed in the region of the organic insulating film 66 where the reflection electrode 54 should be formed. Additionally, in order to connect the reflection electrode 54 with the drain electrode 58, a contact hole 59 is provided in a predetermined region of the organic insulating film 66. An orientation film 67 is formed on the organic insulating film 66 where the reflection electrode 54 was formed, so as to envelop the reflection electrode 54. One substrate 51 is completed in such a manner.

Additionally, a color filter 72 is formed on an insulating substrate 79 made of, for example, glass like the insulating substrate 78. The color filter 72 is composed of, for example, a cyan filter 72a and a red filter 72b which are provided for each picture element. On the color filter 72 is formed a 1000Å thick common electrode 73 made of, for example, ITO. Further an orientation film 74 is formed on the common electrode 73. The other substrate 71 is completed in such a manner.

In forming the orientation films 67, 74 of the substrates 51, 71, respectively, firstly a resin film is formed and then the resin film is baked, for example, at a temperature of 180° C. Further, rubbing treatment in one direction is applied to the resin film, followed by rubbing cleaning, whereby the orientation films are formed. The rubbing cleaning is a treatment of ultrasonically cleaning the surface of a substrate which received the rubbing treatment with an organic solvent such as isopropyl alcohol, which is carried out for the purpose of removing contaminants etc. caused due to rubbing.

The one substrate 51 and the other substrate 71 where the members were formed in the above mentioned manner are arranged so that the orientation films 67, 74 of the substrates 51, 71 are opposed to each other and are bonded with a binding material in which, for example, a 4.5 µm spacer is mixed. The binding material is applied to the periphery of either one of the substrates by the screen process printing method. Additionally, at that time an injection hole for injecting liquid crystals is provided and a liquid crystal material is injected through the injection hole by vacuum injection method. A liquid crystal layer 75 interposed between the pair of substrates 51, 71 is thus formed.

A guest-host-type material wherein a dichroism coloring material of black color is mixed into nematic liquid crystals can be named as an example of a liquid crystal material to be used. In the embodiment, nematic liquid crystals manufactured by Merck under the trade name "ZLI4792" (refractive anisotropy $\Delta n=0.13$) and a mixture of an azo coloring material and an anthraquinone coloring material as a dichroism coloring material were used. Additionally, a 1.3% chiral agent is mixed into the liquid crystal material. The material made by Merck under the trade name "S-811" was used as the chiral agent. The twist pitch PO of the liquid crystal molecules is set to be 5 µm and the depth D of the liquid crystal layer 75 is set by the spacer to be 4.5 µm. Namely d/PO is set to be about 0.9.

Figure 3:
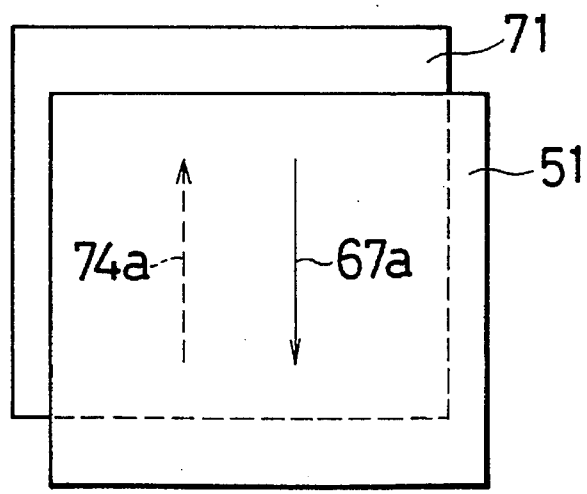
FIG. 3 is a view showing a relationship between directions 67a, 74a of rubbing treatment which was applied to each of orientation films 67, 74 at the time of laminating the pair of substrates.

FIG. 3 is a view showing a relationship between directions 67a, 74a of rubbing treatment which was applied to each of orientation films 67, 74 at the time of laminating the pair of substrates. As shown in FIG. 3, the substrates 51, 71 are laminated so that the rubbing treatment direction 67a for the orientation film 67 and the rubbing treatment direction 74a for the orientation film 74 are opposite to each other. As a result, the twist angle of liquid crystal molecules between the substrates becomes about 360°. In the reflection-type liquid crystal display device 61 having such a constitution, displaying is carried out by the similar operation principle to that of a liquid crystal display device of White a Taylor type guest-host-mode. The twist angle of liquid crystal molecules between the substrates is 720° or more in a liquid crystal display device of White & Taylor type guest-host-mode.

The picture element 76a shown in FIG. 2 represents orientation states of the liquid crystal molecules 75a and the dichroism coloring material 77 at the time when a voltage is not applied. In these states, the liquid crystal molecules 75a are twist-oriented by 360° and the dichroism coloring material 77 is also oriented along the liquid crystal molecules 75a. At that time the light which has entered from the other substrate 71 side is all absorbed by the dichroism coloring material 77 regardless of the polarization directions of the incident light, whereby black color displaying is carried out.

On the other hand, the picture element 76b shown in FIG. 2 represents orientation states of the liquid crystal molecules 75a and the dichroism coloring material 77 at the time when a voltage is applied. In these states, the liquid crystal molecules 75a are oriented along the direction of an electric field in a region apart from the orientation films 67, 74 where the orientation control force of the orientation films 67, 74 is relatively weak, and the dichroism coloring material 77 is also oriented along the liquid crystal molecules 75a. At that time the light which has entered from the other substrate 71 side is reflected against the reflection electrode 54 and outgoes without being absorbed by the dichroism coloring material 77, whereby displaying in a color based on the color filter 72 is carried out.

The constitution of the TFT element 55 is not limited to the bottom-gate constitution as mentioned above and the scope of the invention includes a TFT element with a top-gate constitution. In connection with materials for the gate, source, and drain electrodes 56–58, the scope of the invention includes the use of metals such as Al and Ti, and alloys of Al and Si, and Kr and Ta in addition to the above-mentioned metallic materials. Furthermore, an insulating material such as $SiO_2$ may be employed for the gate insulating film 62. Although an a-SiTFT element as the TFT element 55 was described in the embodiment, a p-SiTFT element may be also employed.

In the embodiment, the refractive anisotropy $\Delta n$ of the liquid crystal material and the thickness d of the liquid crystal layer were set to be 0.13 and about 4.5 µm, respectively, namely the product $\Delta n.d$ of the refractive anisotropy and the thickness amounts to about 0.585 µm. The product $\Delta.d$ is not limited to the above-mentioned value, and is selected preferably to be 1.0 µm or less, more preferably to be 0.6 µm or less. When the product $\Delta n.d$ is too large, the absorption of the dichroism coloring material 77 becomes insufficient due to the optical rotation in the liquid crystal layer 75.

Figure 4A:
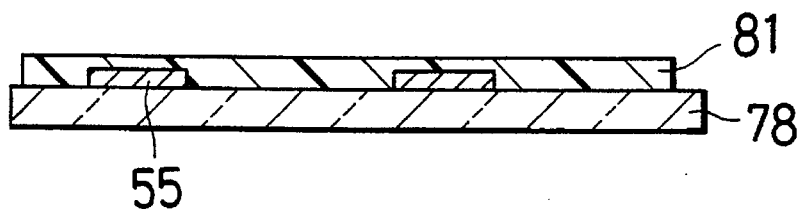
FIGS. 4A–4D are sectional views showing the steps of a method for forming dents 60a, 60b of the surface of a reflection electrode 54 on the one substrate 51.

FIGS. 4A–4D are sectional views showing the steps of a method for forming dents 60a, 60b of the surface of a reflection electrode 54 on the one substrate 51. As shown in FIG. 4A, a resist film 81 is formed on the surface of the insulating substrate 78 to envelop the TFT element 55. The resist film 81 is realized, for example, by the material made by Tokyo Ohka Kogyo Co., Ltd. under the trade name "OFPR-800", and the material is applied by a spin coating method in which the number of the rotations is set to be in the range of 500 to 300 rpm. In the embodiment the resist film material was applied for 30 sec. at 300 rpm to form the resist film 81 having a thickness of 1.2 µm. After applying, prebaking treatment (thermal treatment) is carried out at 100° C. for 30 minutes.

Figure 4B:
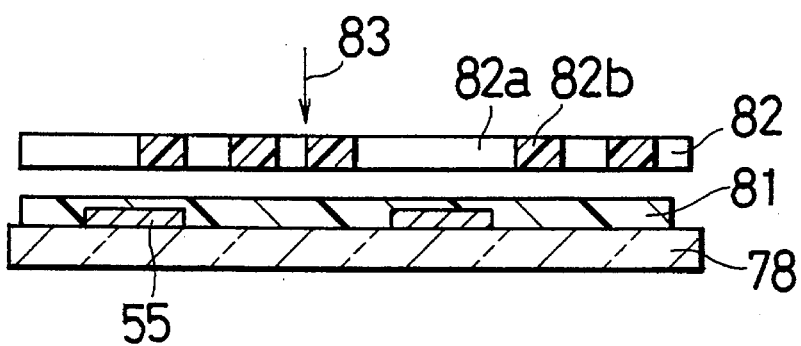

Next, as shown in FIG. 4B, a mask 82 where a light transmitting region 82a and a light shielding region 82b are formed in a predetermined pattern is arranged on the applied resist film 81 and exposure treatment is carried out by light 83. Thereafter development treatment is carried out by the product made by Tokyo Ohka Kogyo Co., Ltd. under the trade name "NMD-3 (2.38%)". Thereby bumps corresponding to the pattern of the mask 82 are formed.

Figure 4C:
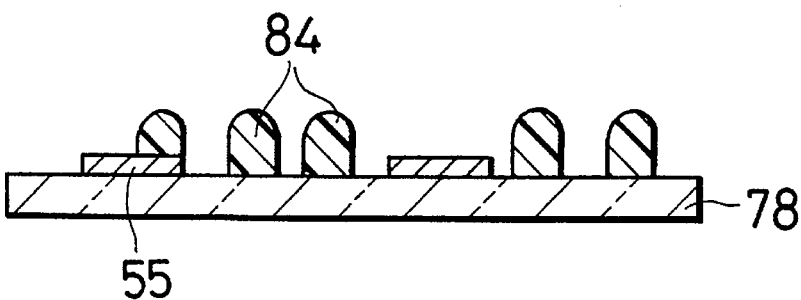

Thermal treatment to such a substrate is carried out, for example, at 120° to 250° C., whereby, as shown in FIG. 4C, a bump 84 whose angles are rounded off is formed. The thermal treatment was carried out at 180° C. for 30 minutes in the embodiment. Additionally the same resist material as that of the resist film 81 is applied to envelop the bump 84 to form an organic insulating film 66 composed of the resist material and the bump 84. The resist material is applied, for example, by the spin coating method, in which the number of rotations and the coating time are selected to be 920 to 3500 rpm and 20 seconds, respectively. The resist material was applied at 2200 rpm for 20 sec. to form the organic insulating film 66 having a thickness of 1 μm in the embodiment. The surface of the formed organic insulating film 66 becomes bumpy due to the bump 84.

Figure 4D:
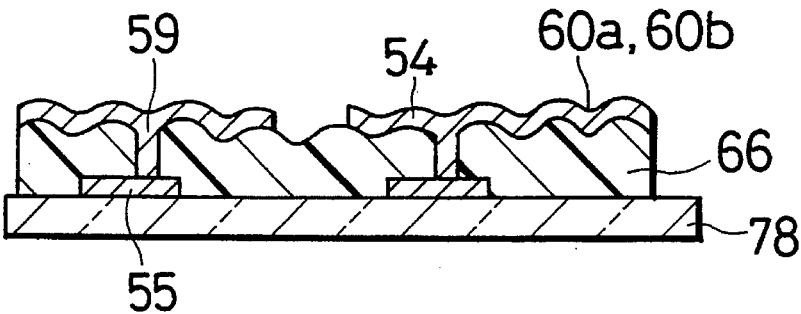

Subsequently the contact hole 59 is formed by the exposure and development treatments on the organic insulating film 66. Additionally a metal film to be used as a reflection electrode 54 is formed on the organic insulating film 66. As the metal film may be used, for example, Al, Ni, Cr, and Ag. The thickness of the metal film is selected to be in the range of 0.01 to 1.0 μm. In the embodiment, an Al film was formed by the vacuum deposition method. Additionally the reflection electrode 54, as shown in FIG. 4D, is formed by exposing, developing and etching the metal film formed in such a manner. The dents 60a, 60b are formed on the surface of the organic insulating film 66 and therefore the surface becomes bumpy.

Figure 5:
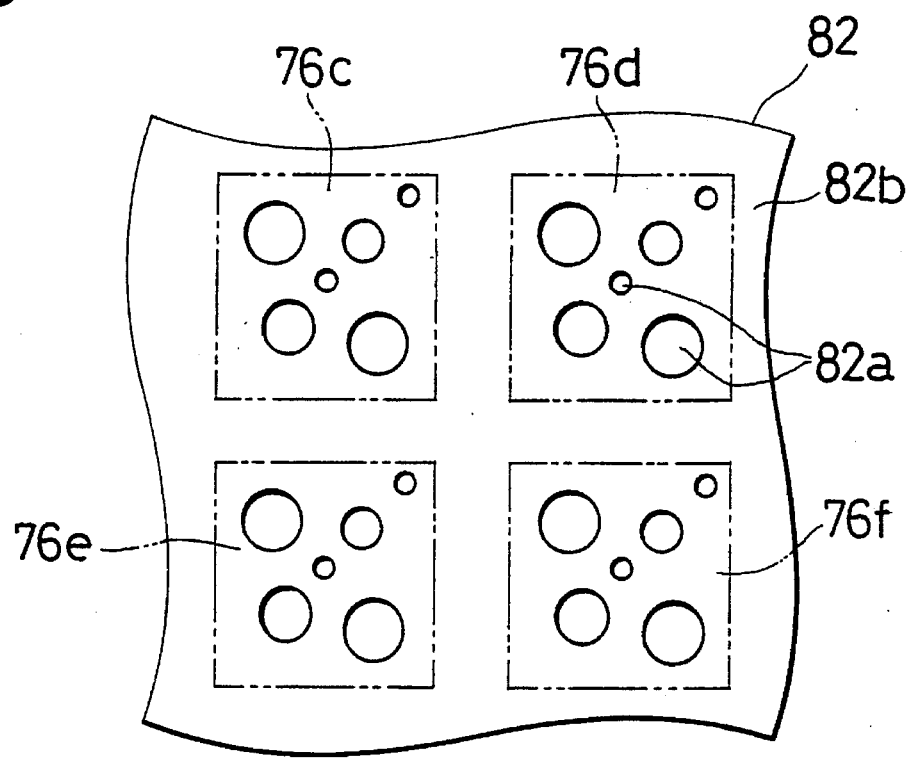
FIG. 5 is a plan view of a mask 82 which is used at the time of forming an organic insulation film 66 having a bumpy surface.

FIG. 5 is a plan view of the mask 82 which is used at the time of forming the organic insulation film 66 having a bumpy surface. A plurality of bumps 84 of the resist material are formed by the use of the mask 82 as described above and the organic insulating film 66 is formed by applying the resist material so as to envelop the bumps 84. The form and arrangement pattern of the bumps 84 are determined by a light transmitting region 82a and a light shielding region 82b comprised in the mask 82 and also the form and arrangement pattern of the dents 60a, 60b are determined by the same. The arrangement patterns of the light transmitting region 82a of the mask 82 are the same, for example, in the picture elements 76c–76f.

Figure 6:
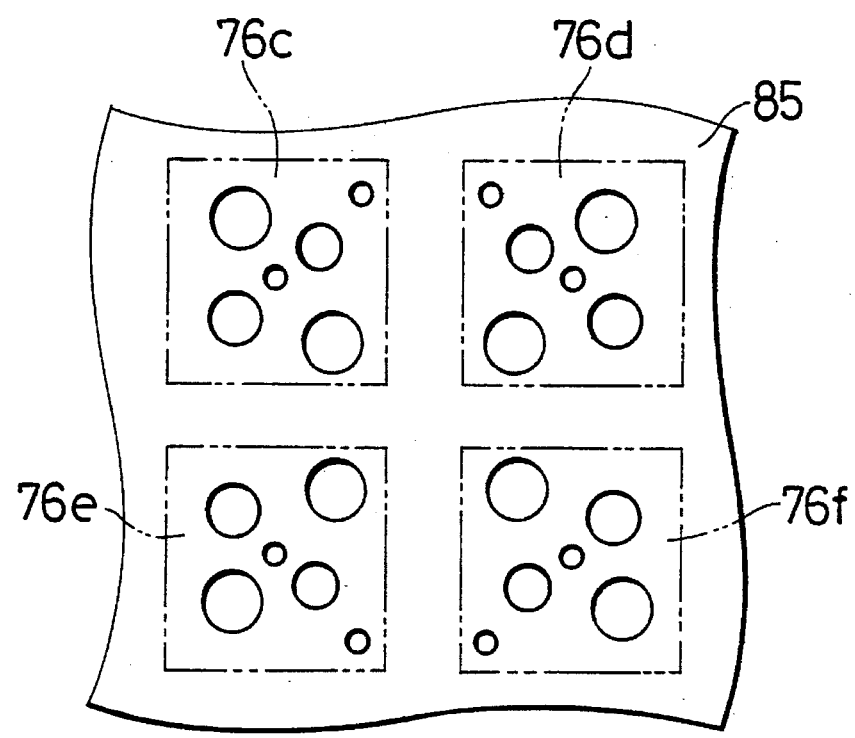
FIG. 6 is a plan view of another mask 85.

FIG. 6 is a plan view of other masks 85. The masks 85 are arranged so as to be reversed in the picture elements adjacent to each other. Namely, in the case of the picture element 76c, the relationship of the arrangement pattern between the picture elements 76c, 76d and between the picture elements 76c, 76e becomes linear-symmetrical and this is applicable in other picture elements 76d–76f.

Besides the above described masks 82, 85, the following masks 86–90 may be employed as the mask which is used at the time of forming the organic insulating film 66 having a bumpy surface.

Figure 7:
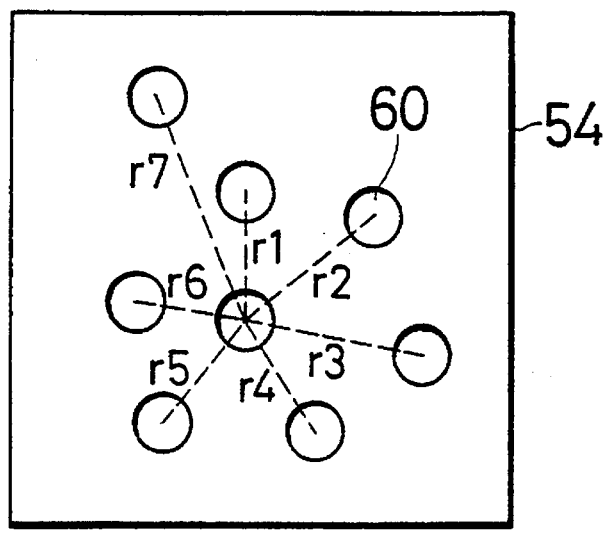
FIG. 7 is a view showing distances r among plural dents 60 on the surface of the reflection electrode 54.
Figure 8:
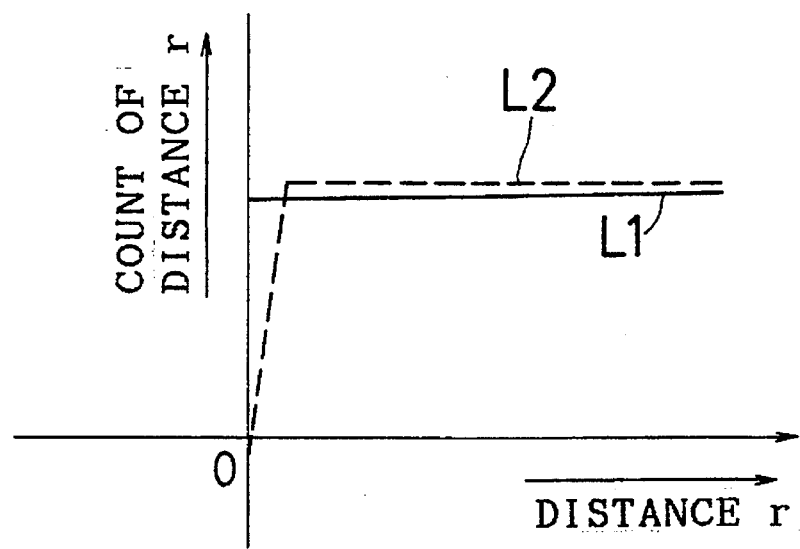
FIG. 8 is a diagram showing a relationship between the distances r and the number of the distances r found on the surface of one reflection electrode 54.

FIG. 7 is a view showing distances r among the plural dents 60 on the surface of one reflection electrode 54. FIG. 8 is a diagram showing a relationship between the distances r and the number of the distances r found on the surface of the reflection electrode 54. In the embodiment, although the plural dents 60 are preferably arranged to be irregular in one reflection electrode 54, each of the distances r1–r7 among the dents as shown in FIG. 7 should be found in the same frequency in order to irregularly arrange the dents 60 in the true sense. The frequency figures a line as indicated by a reference numeral L1 in FIG. 8 in an ideal arrangement. In practice, however, it figures a line as indicated by a reference numeral L2 because the case where the distance r infinitely approaches 0 seldom or never occurs. As a result interference of reflected light, which leads to degradation of display quality, is caused. A mask for forming dents 60 overlapping each other is used in order to eliminate the interference of reflected light.

Figure 9A:
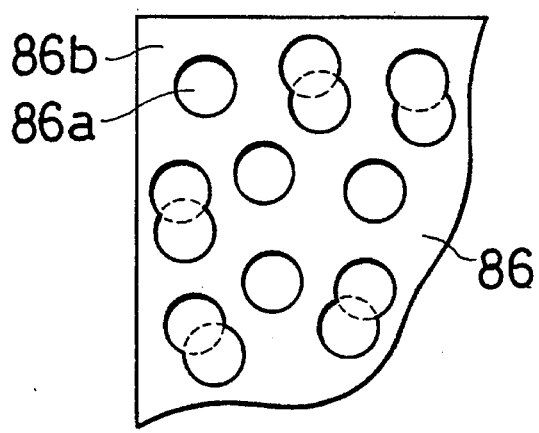
FIGS. 9A–9E are plan views of other masks 86–90.
Figure 9D:
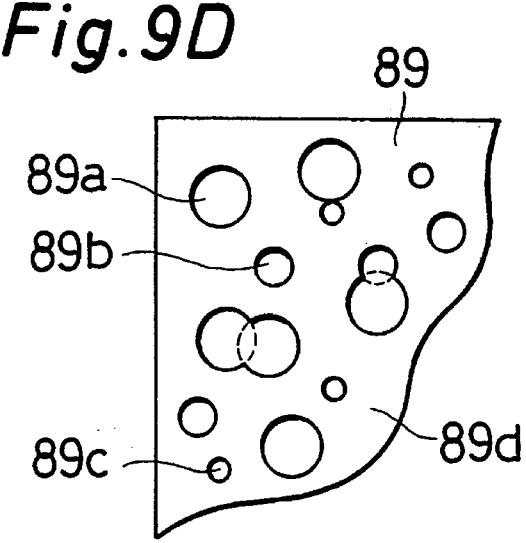
Figure 9B:
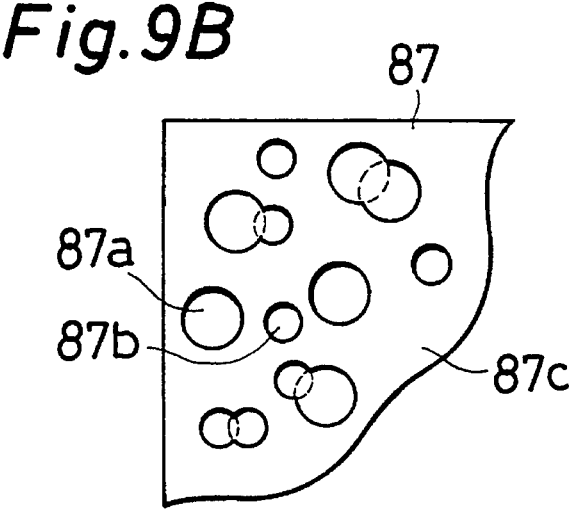
Figure 9E:
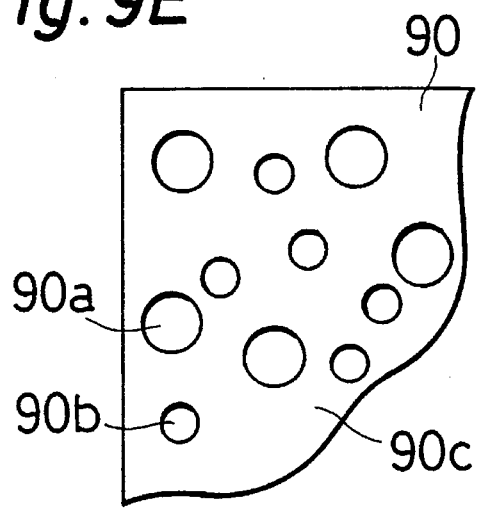
Figure 9C:
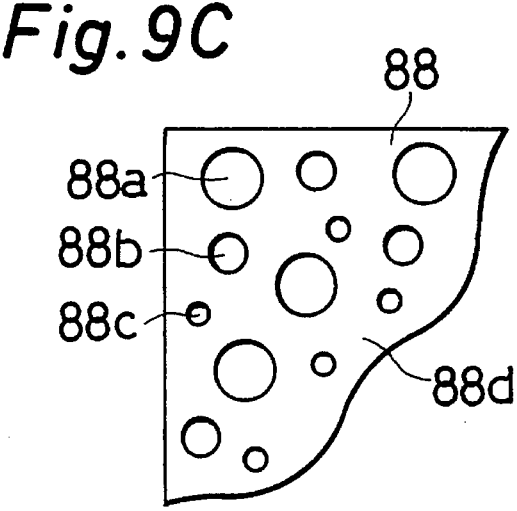

FIGS. 9A–9E are plan views of other masks 86–90. Light transmitting regions 86a whose dimensions are of one type are formed in the mask 86 as shown in FIG. 9A and the light transmitting regions 86a have an area overlapping each other. The other regions are light shielding regions 86b. In the mask 87 shown in FIG. 9E are formed light transmitting regions 87a, 87b of two types of dimensions, which have an area overlapping each other. The other regions are light shielding regions 87c. In the mask 88 shown in FIG. 9C are formed light transmitting regions 88a–88e of three types of dimensions. The other regions are light shielding regions 88d. The light transmitting regions 88a–88c of the mask 88 are formed not to overlap each other. In the mask 89 shown in FIG. 9D are formed light transmitting regions 89a–89c of three types of dimensions, which have an area overlapping each other. The other regions are light shielding regions 89d. In the mask 90 shown in FIG. 9E are formed light transmitting regions 90a, 90b of two types of dimensions. The other regions are light shielding regions 90c. The light transmitting regions 90a, 90b of the mask 90 are formed not to overlap each other.

The bumpy surface according to the invention can be formed on the reflection electrode 54 by the use of any of the masks 82, 85–90. Additionally the light transmitting/light shielding portions to be formed in the masks 82, 85–90 are selected in correspondence with the photosensitivity of the resist material to be used (negative or positive type). In order to eliminate the above-mentioned interference of reflected light, the masks 86, 87, 89 as shown in FIG. 9A, 9B, 9D are employed.

Figure 10A:
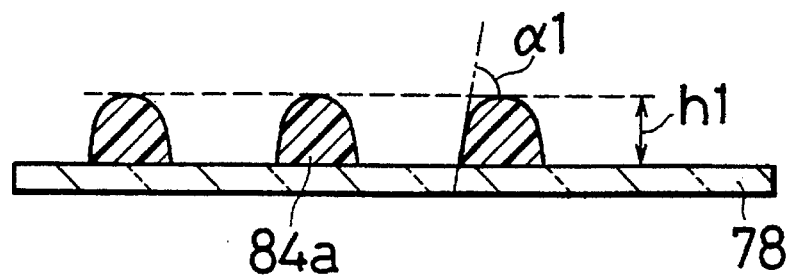
FIGS. 10A–10B are sectional views of bumps 84a, 84b formed on an insulating substrate 78, respectively.
Figure 10B:
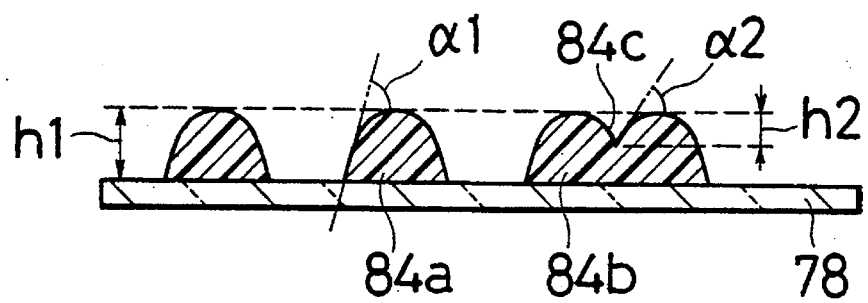

FIGS. 10A–10B are sectional views of bumps 84a, 84b formed on an insulating substrate 78, respectively, in the above-mentioned manner. FIG. 10A shows a case where a mask in which bumps to be formed do not overlap each other is used, and FIG. 10B shows a case where a mask in which a part of the bumps to be formed overlap each other is used. As shown in FIG. 10A, all of the bumps 84a formed by the use of the mask in which the bumps do not overlap each other have a height h1. Additionally, in the sectional view of FIG. 10A, all the angles formed by the surface of the substrate 51 and a hypothetical line from the surface of the substrate 51 along the slope of each bump 84a are angles α1.

On the other hand, when the mask in which a part of the bumps to be formed overlap each other as shown in FIG. 10B is used, one bump 84a of bumps 84a, 84b formed by the mask are the same as those shown in FIG. 10A and the other bump 84b of the bumps 84a, 84b has a dent 84c formed by the regions overlapping each other in the mask. The length from the deepest point of the dent 84c to the highest point of the bump 84b is h2. Additionally, in the sectional view of FIG. 10B, the angle contained by a plane which is parallel to the surface of the substrate 51 and includes the deepest point of the dent 84c and a hypothetical line from the surface of the substrate 51 along the slope of each bump 84b is an angle β2.

The reflection electrode 54 of the embodiment is nearly rectangular as shown in FIG. 1. When the length of the reflection electrode 54 excepting the length of the TFT element 55 in the longitudinal direction is indicated by A1, the distance of the reflection electrode 54 excepting the distance of the TFT element 55 in the transverse direction is indicated by B1, the dimension of the peripheral portion 54a of the reflection electrode 54 in the direction parallel to the longitudinal direction is indicated by A2, and the dimension the peripheral portion 54a of the reflection electrode 54 in the direction parallel to the transverse direction is indicated by B2, (A2/A1)×100 and (B2/B1)×100 are selected to be in the range of from 0.3 to 10%.

In the embodiment, 300 μm and 150 μm were selected as A1 and B1, respectively. Additionally, 3 μm was selected as A2 and B2, and therefore (A2/A1)×100=1%, and (B2/B1)×100=2%. In the embodiment, when A2 is in the range of 0.9 to 30 μm, and B2 is in the range of 0.5 to 15 μm, the above mentioned conditions are met. When both A2 and B2 are below the ranges, it is demonstrated that the peeling of the reflection electrode 54 is caused by the penetration of an etchant at the time of etching for forming the reflection electrode 54. On the other hand, both A2 and B2 exceed the ranges, the effect on reflecting light from all angles toward a direction perpendicular to a display screen is lowered and therefore the improvement of the brightness of display image can not be achieved.

The following table shows the relationships among the value of X ((A2/A1)×100 or (B2/B1)×100), display conditions of the reflection-type liquid crystal display device and occurrence of peeling. It is demonstrated that, when X is 0%, the peeling of the reflection electrode 54 occurs, although the display conditions are excellent. Additionally, it is demonstrated, when X is 20%, the effect on reflecting light from all angles toward a direction almost perpendicular to the display screen cannot be satisfactorily obtained because of the excessively high mirror reflectivity, although the peeling does not occur. It is demonstrated that, when X is 0.3, 5, and 10%, the display conditions are moderately excellent and the peeling of the reflection electrode 54 never or little occurs.

TABLE 1

| X (%) | 0 | 0.3 | 5 | 10 | 20 |
| --- | --- | --- | --- | --- | --- |
| display conditions | excellent | excellent | excellent | good | high mirror reflectivity |
| peeling | yes | little | no | no | no |

Figure 11:
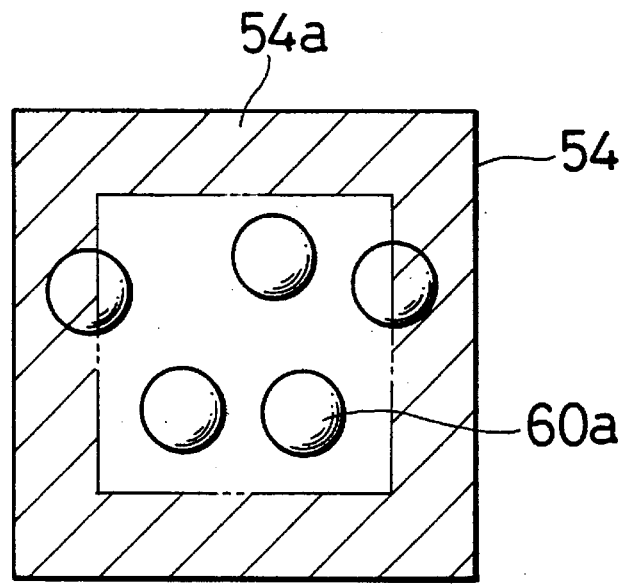
FIG. 11 is a plan view of another example of dents 60a formed on the reflection electrode 54.

FIG. 11 is a plan view of another example of a dent 60a formed on the reflection electrode 54. Although the above mentioned example is an example in which the dent 60a is not formed in the peripheral portion 54a at al, an example such that the dent 60a is formed in the peripheral portion 54a is also included within the scope of the invention. However, as described above, the ratio of the area where the area of the dent 60a is subtracted from the total area of the peripheral portion 54a, namely the area indicated by oblique lines in FIG. 11, to the total area of the peripheral portion 54a is selected to be in the range of 60 to 100%. It is demonstrated that, when the ratio is less than 60%, the peeling of the reflection electrode 54 is caused by the penetration of an etchant between the reflection electrode 54 and the organic insulating film 66 at the time of etching for forming the reflection electrode 54.

Figure 12:
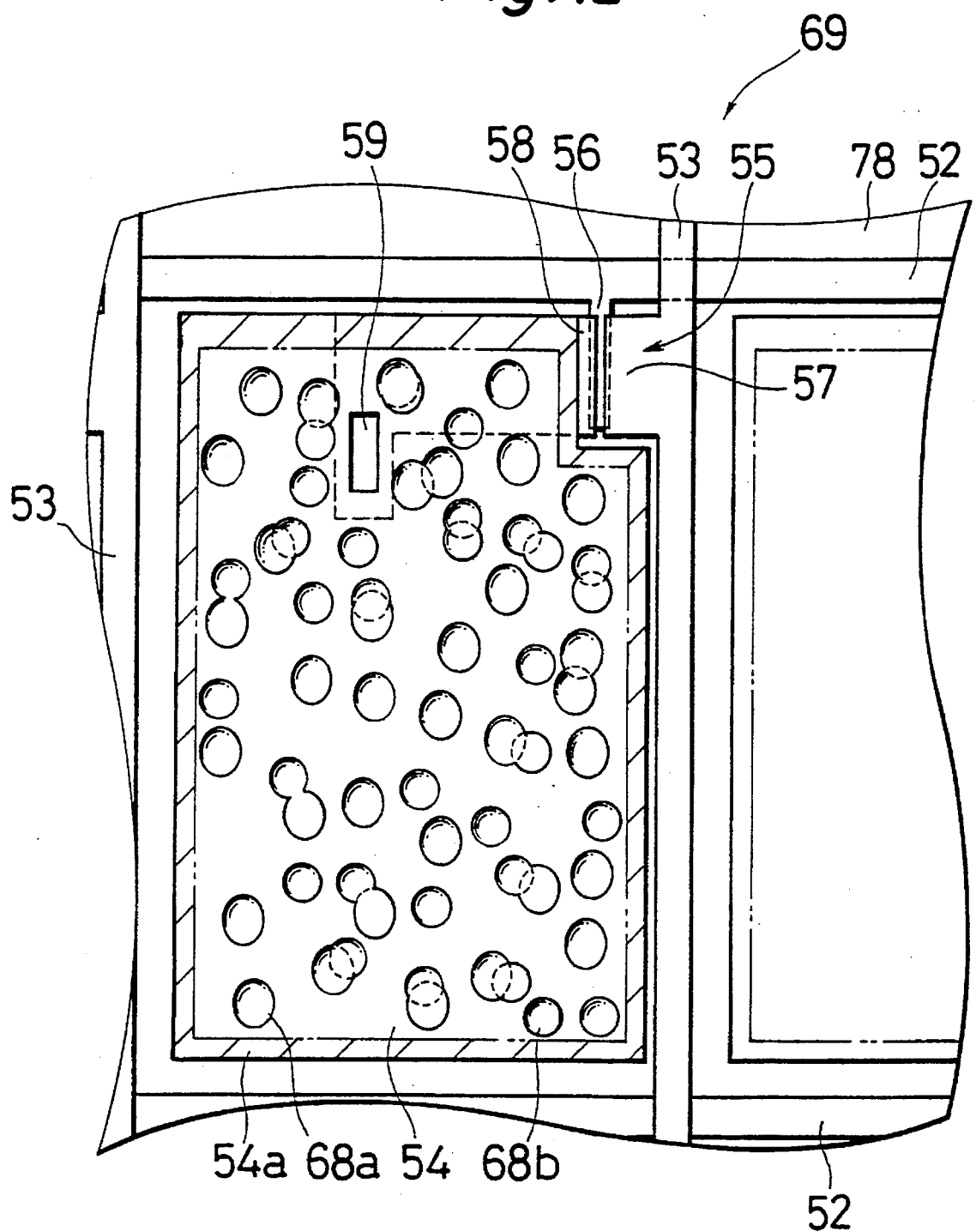
FIG. 12 is a plan view of one substrate 69 of a pair of substrates of other reflection-type liquid crystal display device of invention.

FIG. 12 is a plan view of one substrate 69 of a pair of substrates of other reflection-type liquid crystal display device of the invention. Although the one substrate 69 is composed of the same members as those of the one substrate 51, the one substrate 69 is characterized in that the reflection electrode 54 of the one substrate 69 is provided with bumps 68a, 68b instead of the dents 61a, 61b. The bumps 68a, 68b are formed under the same conditions and in the same manner as those of the dents 61a, 61b. Also by providing the reflection electrode 54 with the bumps 68a, 68b the same effect as that above-mentioned can be obtained.

Figure 13:
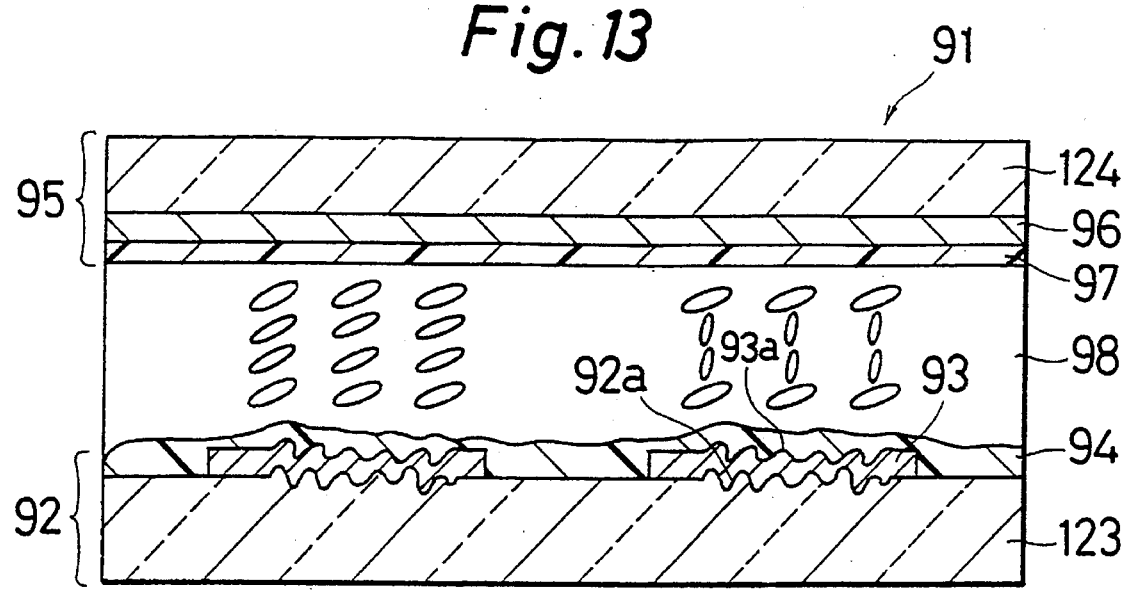
FIG. 13 is a sectional view of a reflection-type liquid crystal display device 91 of other embodiment of the invention in which the surface of the reflection electrode 54 is made bumpy by another method.
Figure 14:
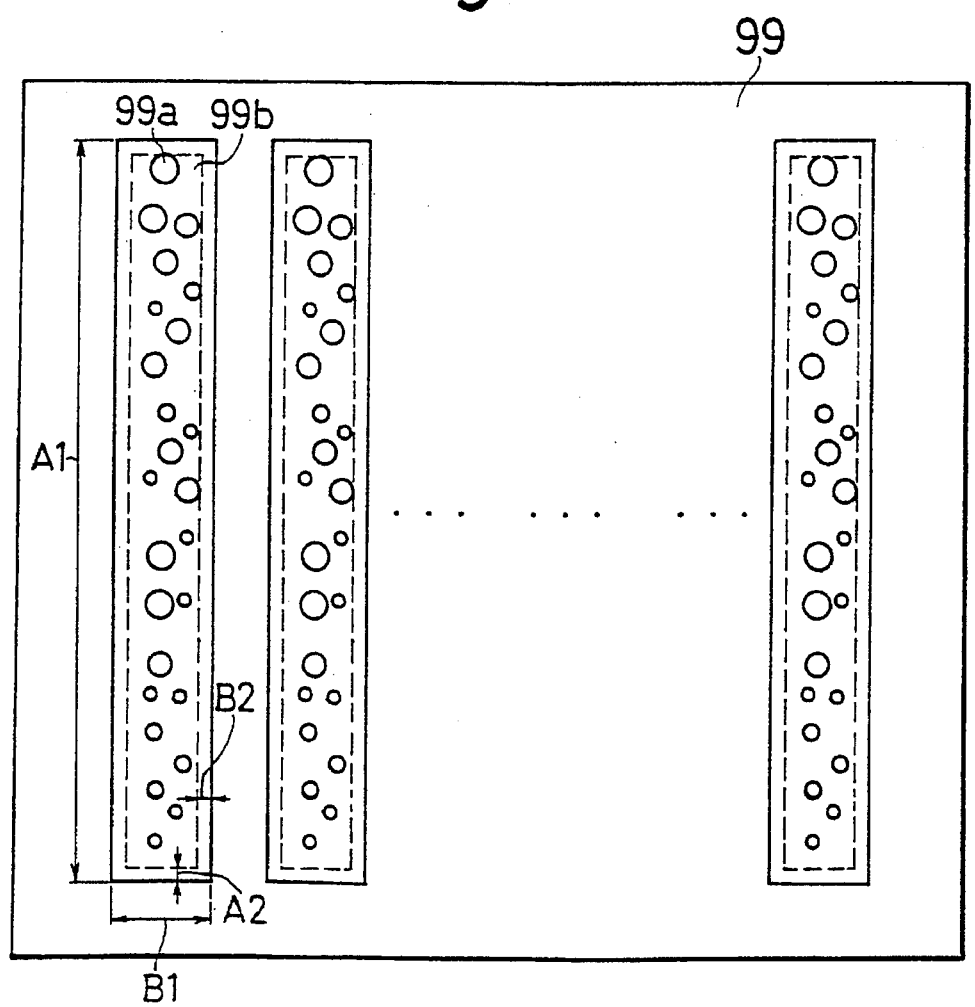
FIG. 14 is a plan view of a mask 99 which is used at the time of forming a dent 92a on an insulating substrate 123 of the reflection-type liquid crystal display device 91.

FIG. 13 is a sectional view of a reflection-type liquid crystal display device 91 of other embodiment of the invention in which the surface of the reflection electrode 54 is made bumpy by another method. FIG. 14 is a plan view of a mask 99 which is used at the time of forming a dent 92a on an insulating substrate 123 of the reflection-type liquid crystal display device 91. The reflection-type liquid crystal display device 91 comprises a pair of substrates 92, 95, at least one of which is light transmitting, and a liquid crystal layer 98 interposed between the pair of substrates.

A plurality of strip-shaped reflection electrodes 93 which are to be arranged in parallel to each other at spaces there among are formed on the surface of an insulating substrate 123 which is realized by glass and composes one substrate 92 of the pair of substrates 92, 95. Firstly a dent 92a is formed on a predetermined region of the insulating substrate 123 in which the reflection electrode 93 is to be formed. The dent 92a is formed by firstly forming a photo resist film on the insulating substrate 123, secondly disposing a mask 99 shown in FIG. 14 on the resist film, next exposing and developing the resist film, and then etching the resist film by the use of, for example, hydrofluoric acid. The mask 99 shown in FIG. 14 has a light transmitting region 99a and a light shielding region 99b, which are the same as those of the masks 82, 85–90, on a region corresponding to one reflection electrode measuring A1×B1. Since a dent is formed in a peripheral portion having a predetermined dimension in a direction from the edge of the reflection electrode toward the inside under the same conditions, the arrangement of the light transmitting region 99a and the light shielding region 99b in the peripheral portion having dimensions of A2 and B2 of the mask 99 is selected so as to correspond to the dent.

An Al film having a thickness of 0.5 μm is formed on the insulating substrate 123 in which the dent 92a is formed, for example, by a vacuum deposition method. Subsequently the Al film is exposed, developed and etched to form the reflection electrode 93 in a predetermined position. A dent 93a is formed on the surface of the reflection electrode 93 by the dent 92a of the insulating substrate 123. Additionally an orientation film 94 is formed on the insulating substrate 123 to envelop the reflection electrode 93. In such a manner the one substrate 92 is prepared.

Furthermore a plurality of strip-shaped light transmitting electrodes 96 which are to be arranged in a direction perpendicular to the reflection electrode 93 are formed on an insulating substrate 124 made by, for example, glass and besides an orientation film 97 is formed. In such a manner the other substrate 95 is prepared and the pair of substrates 92, 95 are arranged so that the orientation films 94, 97 of the substrates 92, 95 are opposed to each other and are bonded through a liquid crystal layer 98 in the same manner as that of the reflection-type liquid crystal display device 61. The portion where the reflection electrode 93 and the strip-shaped electrode 96 overlap is a picture element. The liquid crystal layer 98 is realized by the same material as that of the liquid crystal layer 75. Also the direction of orientation treatment for the orientation films 94, 97 is arranged in the same manner as that of the orientation films 67, 74.

As mentioned above, the surface of the reflection electrode 93 can be made bumpy also by directly forming the dent 92a on the insulating substrate 123 made of glass.

Additionally, when the dent 93a is not formed in the peripheral portion of the reflection electrode 93, it is also possible to form the dent 92a on the surface of the insulating substrate 123 made of glass in the well-known sandblast method or polishing method by the use of a mask which covers a portion corresponding to the peripheral region in the region of the insulating substrate 123 where the reflection electrode is to be formed. Besides it is also possible to form the dent 92a by beads application. In addition to those, a manner wherein an Al-Si alloy film is formed and etched, a manner wherein a $SiO_2$ film having an bumpy surface is formed by the CVD method, and a manner wherein a $SiO_2$ film is formed and etched may be employed to form the dent 92a.

Figure 15A:
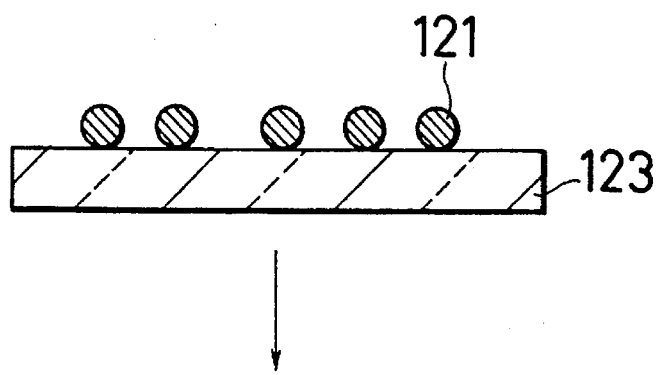
FIGS. 15A–15C are sectional views showing the treatment steps of polishing method.
Figure 15B:
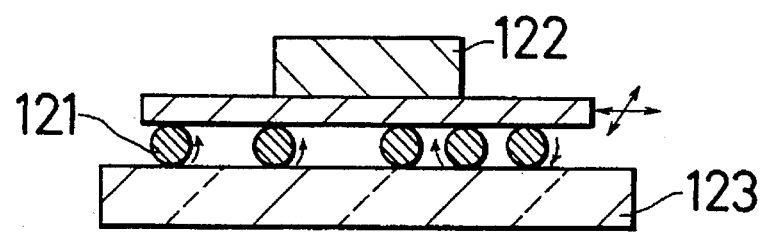
Figure 15C:
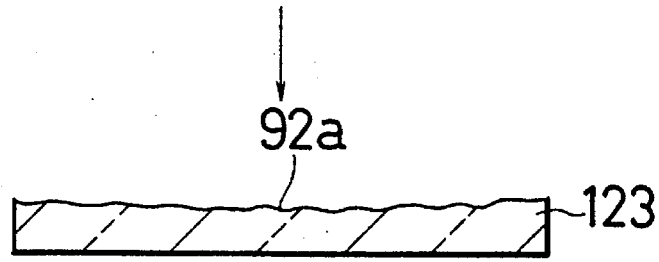

FIGS. 15A–15C are sectional views showing the processing steps of the polishing method. The polishing method is a method such that spheroidal beads 121 are dispersed on the surface of the insulating substrate 123 as shown in FIG. 15A; a plate member 122, as shown in FIG. 15B, is arranged on the beads 121 dispersed surface of the insulating substrate 123; then the plate member is pressed and slided right, left and diagonally to rub the beads against the surface of the insulating substrate 123; and finally, as shown in FIG. 15C, the plate member 122 and the beads 121 are removed, whereby the dent 92a is formed on the surface of the insulating substrate 123.

On the other hand, the beads application is a method disclosed in Japanese Unexamined Patent Publication JP-A 4-308816 (1992) of the application by the present applicant and others, wherein a number of fine asperities are formed by applying to the surface of a substrate an organic insulating resin in which particles are added and thereafter baking.

Figure 16:
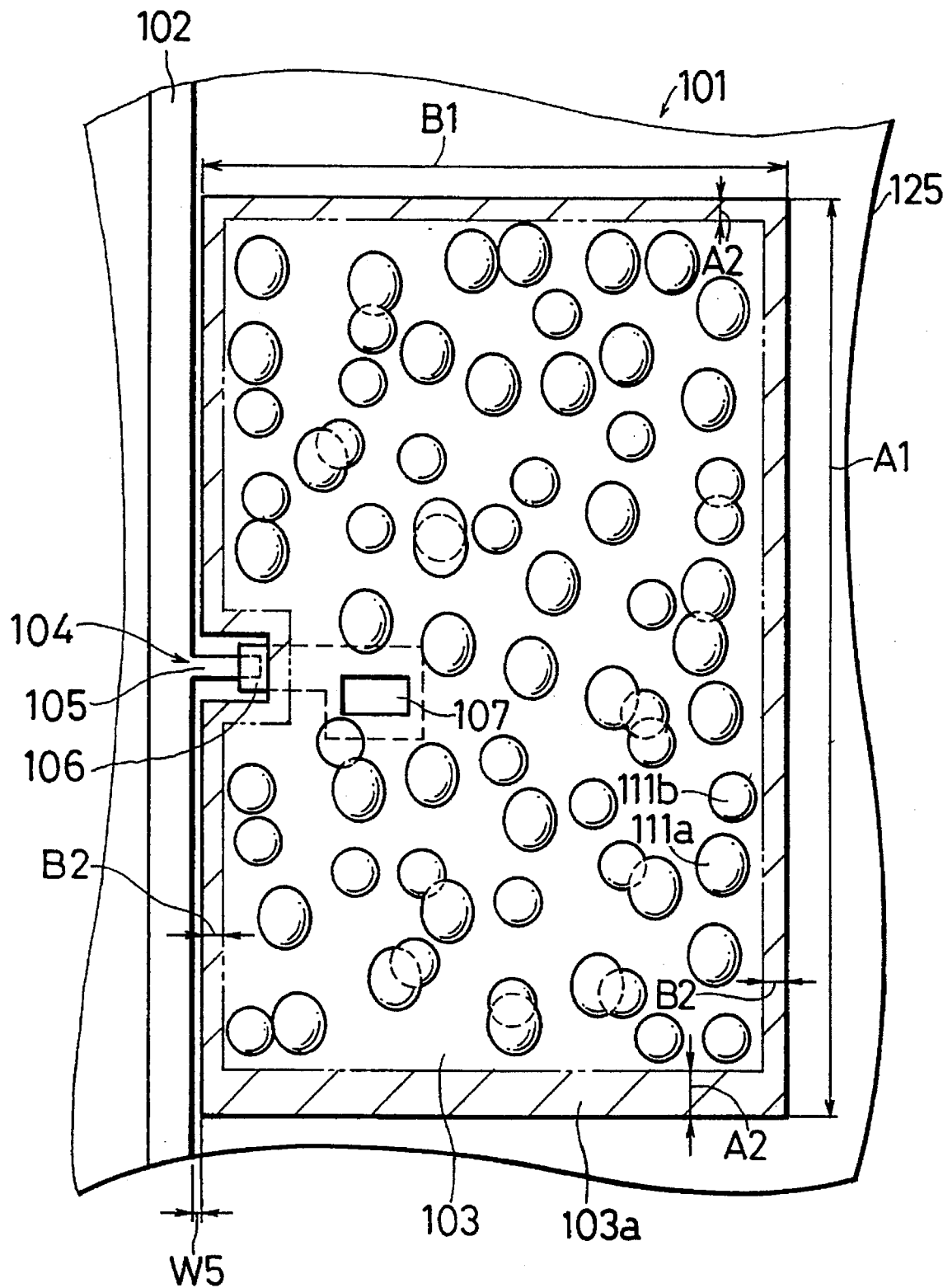
FIG. 16 is an enlarged plan view of one substrate 101 of a pair of substrates of a reflection-type liquid crystal display device 119 of another embodiment of the invention.

FIG. 16 is an enlarged plan view of one substrate 101 of a pair of substrates of a reflection-type liquid crystal display device 119 of another embodiment of the invention. The reflection-type liquid crystal display device 119 comprises a pair of substrates at least one of which is light transmitting and a liquid crystal layer interposed between the pair of substrates.

A plurality of signal wirings 102 are arranged in parallel to each other on the surface of an insulating substrate 123 which is realized by, for example, glass and composes one substrate 101 of the pair of substrates. A lower electrode 105 branches off from the signal wiring 102. Additionally a plurality of almost rectangular reflection electrodes 103 are arranged in matrix form. The reflection electrode 103 and the signal wiring 102 are arranged at spacings W5 in order to maintain the insulation property between the reflection electrode 103 and the signal wiring 102. The reflection electrode 103 and the signal wiring 102 are connected through a two terminal element 104, which is a switching element. The two terminal element 104 comprises the lower electrode 105, an upper electrode 106, and an insulating layer 109 interposed between the electrodes 105, 106. The upper electrode 106 and the reflection electrode 103 are connected through a contact hole 107.

A plurality of dents 111a, 111b are formed on the surface of the reflection electrode 103, whereby the surface is made bumpy. Although the plurality of dents 111a, 111b are found on the almost entire surface of the reflection electrode 103, the dents 111a, 111b in a peripheral portion 103a of the reflection electrode 103 indicated by oblique lines, namely in a region having predetermined dimensions from the edges toward the inside of the reflection electrode 103 are formed under the same conditions as those of the foregoing embodiment. FIG. 16 shows a case where no dents 111a, 111b were formed in the peripheral portion 103a. The predetermined dimensions are indicated by A2, B2.

Figure 17:
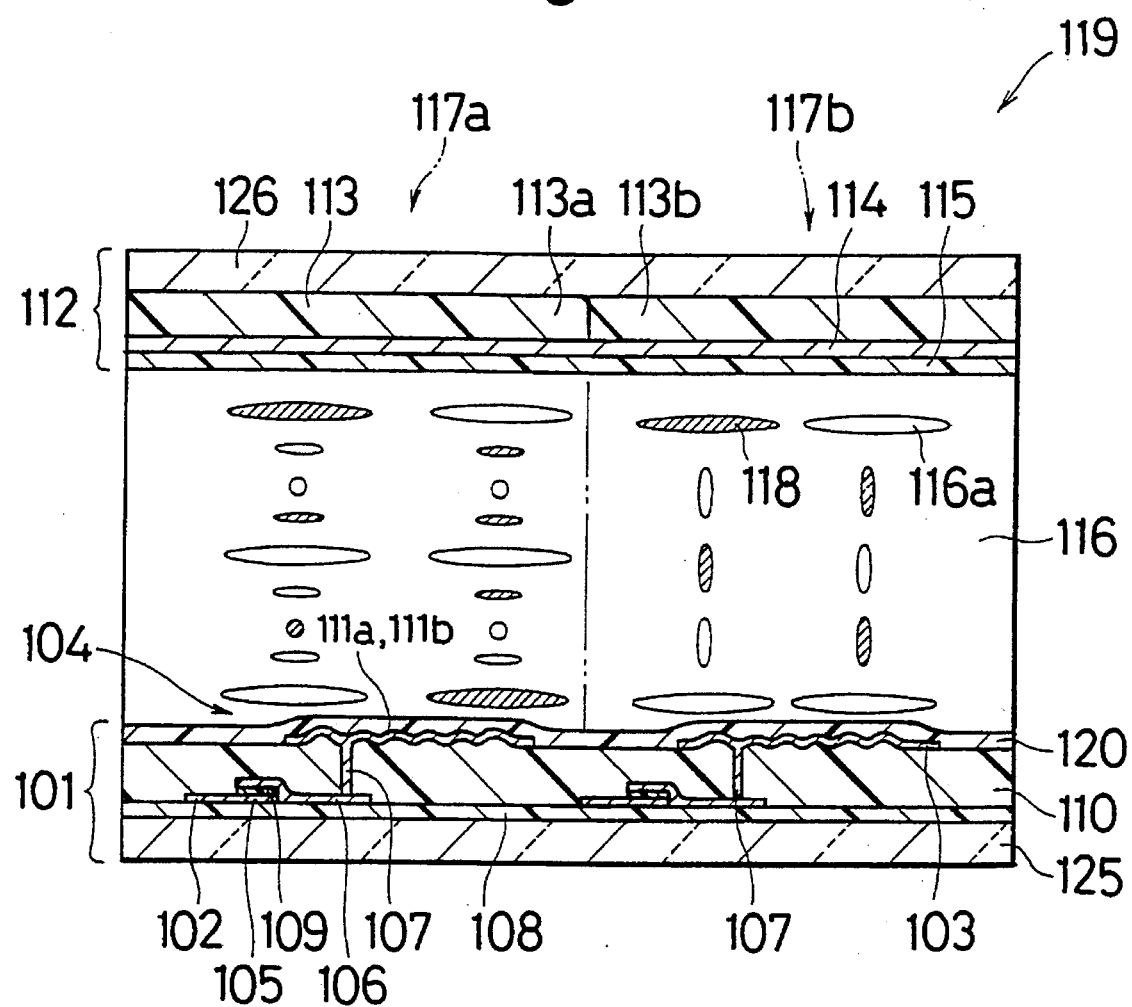
FIG. 17 is a sectional view of the reflection-type liquid crystal display device 119.

FIG. 17 is a sectional view of the reflection-type liquid crystal display device 119. Referring to FIG. 17, a method for manufacturing the reflection-type liquid crystal display device 119 will be described. First a base coat film 108 is formed on an insulating substrate 125 made of, for example, glass. The base coat film 108 is realized by forming a $Ta_2O_5$ film having a thickness of 5000Å by a spattering method. As the insulating substrate 125 may be used a nonalkaline glass containing a trace of alkaline contents (e.g., below 1 wt %), boro-silicate glass, and soda glass, etc. In the embodiment the glass made by Corning under the trade name "#7059" was employed. Although the description regarding the formation of the base coat film 108 is omitted in the specification, the contamination caused by the insulating substitute 125 can be prevented by the formation of the base coat film 108 and as a result excellent display features can be obtained.

Next the signal wiring 102 and the lower electrode 105 are formed on the base coat film 108. Initially, a Ta film having a thickness of 3000Å by, for example, a reactive-type spattering method is formed and patterned in a predetermined shape by photolithography. At the time of spattering for the Ta film, Ta with a purity of 99.99% was used. Additionally a mixture of argon and nitrogen gases is used as a reaction gas. The content of nitrogen can be regulated by regulating the nitrogen gas flow to the total flow of the mixture of argon and nitrogen gases. In the embodiment, 4.3% was employed as the nitrogen concentration. The two-terminal element 104 with an excel lent non-linear property can be obtained by selecting the nitrogen concentration to be in the range of 3 to 7%, more preferably of 4 to 5.5%.

The patterned Ta film is anodized by the use of a 1% ammonium tartrate solution as an electrolyte. By this anodization the anodized part of the surface of the Ta film becomes the insulating layer 109. The signal wiring 102 and the lower electrode 105 are formed by the not-anodized part of the surface of the Ta film. The thickness of the insulating layer 109 is selected to be, for example, 600Å.

Additionally a metal film to become the upper electrode 106 is formed on the base coat film 108 where the insulating layer 109 is formed. The metal film is formed, for example, by the spattering method, and thereafter the film is patterned by photolithography to become the upper electrode 106. As the upper electrode 106 may be used, for example, Ta, Cr, Ti, and Al, and Ti was used in the embodiment. The two-terminal element 104 is formed in such a manner.

The organic insulating film 110 whose surface is to become bumpy in the same manner as that of the foregoing embodiment is formed on the base coat film 108 where the two-terminal element 104 is formed. Additionally the reflection electrode 103 is formed on the organic insulating film 110 formed and the dents 111a, 111b are formed also on the surface of the reflection electrode 103 by the dents formed on the surface of the organic insulating film 110. Consequently, dents corresponding to the dents 111a, 111b of the surface of the reflection electrode 103 are formed in the region of the organic insulating film 110 where the reflection electrode 103 is to be formed. Additionally the contact hole 107 for connecting the reflection electrode 103 with the upper electrode 106 is provided in the organic insulating film 110. An orientation film 120 is formed to cover the reflection electrode 103, on the organic insulating film 110 where the reflection electrode 103 is formed. One substrate 101 is prepared in such a manner.

On the other hand, it is the same as in the foregoing embodiment that a color filter 113 is formed on the insulating substrate 126 composing the other substrate 112. The color filter 113 is composed of, for example, a cyan filter 113a and a red filter 113b which are provided to correspond to each picture element. A common electrode 114 having a thickness of 2000Å which is realized by, for example, ITO is formed on the color filter 113. The common electrode 114 is patterned into a strip-shape by photolithography. An orientation film 115 is formed on the color filter 113 to cover the patterned common electrode 114. The other substrate 112 is formed in such a manner.

One substrate 110 and the other substrate 112 where each member is formed are bonded through a liquid crystal layer 116 in the same manner as the foregoing embodiment. The liquid crystal layer 116 is realized by the same material as that of the liquid crystal layer 75. Displaying is carried out at the time of applying and not applying a voltage by the same principles as those in the reflection type liquid crystal display device 51 in the thus composed reflection-type liquid crystal display device 119. Picture elements 117a, 117b shown in FIG. 17 represent the states at the times of not applying and applying a voltage, respectively.

As described above, according to the embodiment, the reflection electrodes 54, 93, 103 have bumpy surfaces, and relatively a few or no bumps or dents are provided in the peripheral portions 54a, 103a. In order to make the surfaces of the reflection electrodes 54, 93, 103 bumpy, the surfaces where the reflection electrodes 54, 93, 103 are to be formed is made bumpy, and a metal film to become a reflection electrode is formed on each entire surface and patterned, whereby the reflection electrodes 54, 93, 103 are formed. The patterning of the metal film is conducted by etching, whereby an unnecessary metal film is dissolved to be removed. In the reflection-type liquid crystal display devices 61, 91, 119, relatively a few or no dents or bumps are provided in the peripheral portions of the reflection electrodes 54, 93, 103 and therefore relatively a few or no dents or bumps are provided in the portions of the surfaces where the reflection electrodes are to be formed, corresponding to the peripheral portions of the reflection electrodes 54, 93, 103. As a result, the interface between the metal film and the surface where the reflection electrodes are to be formed becomes relatively small and the penetration amount of etchant penetrated through the interface becomes smaller.

Consequently the reflection electrodes 54, 93, 103 can be prevented from peeling from the edges thereof and defective picture elements can be avoided. Additionally, a short circuit due to a peeled electrode is prevented from occurring between the other reflection electrodes and a common electrode opposite to the reflection electrodes.

Since the surfaces of the reflection electrodes 54, 93, 103 are bumpy, it is possible to reflect the light incident from all angles in a direction almost vertical to the surface of the display screen and obtain a bright display image. Besides, the reflection electrodes 54, 93, 103 functions as reflection plates, whereby parallax is not caused in comparison with a reflection-type liquid crystal wherein a reflection plate is arranged on the counter side to the liquid crystal layer side of one substrate 51, 92, 101.

Although an example such that the TFT element 55 and the two-terminal element 104 are comprised as switching elements 104 was described in the above embodiment, the two-terminal element is realized, for example, by a MIM element. Additionally a varister element and a diode ring element may be used.

Although an guest-host mode as a display mode of a liquid crystal display device was described in the embodiment, in addition to that, the reflection-type liquid crystal display device is applicable also in a FDLC (Folymer Dispersed Liquid Crystal) mode, a mode in which one polarizing plate is used, a phase transition mode, and a mode in which a ferroelectric liquid crystal is used. Further, although an example such that a complementary-color filter is used as a color filter was described in the embodiment, a red-color, a green-color, and a blue-color filter may be used, and as well as the reflection-type liquid crystal display device-may be applicable to a black-and-white liquid crystal display device wherein no color filter is used.

Additionally, although the reflection electrodes 54, 103 and the wirings 52, 53, 102 are formed at intervals W1–W5 on the organic insulating films 66, 110 in the embodiment, the reflection electrodes 54, 103 may be formed to be superposed on the wirings 52, 53, 102, because the organic insulating films 66, 110 are formed to cover the wirings 52, 53, 102. In this case the reflection electrodes 54, 103 are formed at an interval so that the electrical insulation between the adjacent reflection electrodes can be maintained, whereby the areas of the reflection electrodes 54, 103 are enlarged and a brighter display image can be obtained.

Figure 18:
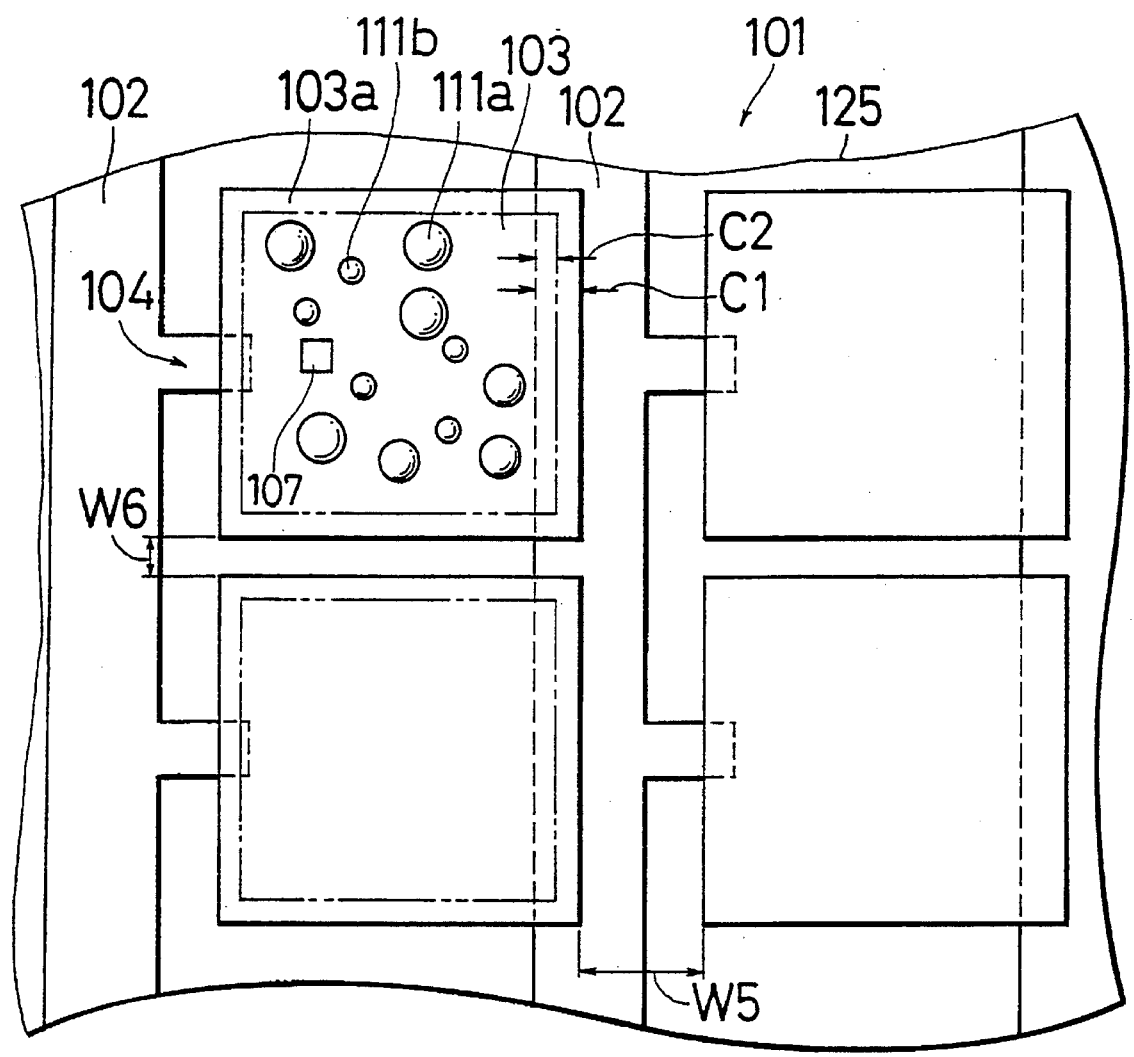
FIG. 18 is a plan view of one substrate 101 of a pair of substrates in which a reflection electrode 103 is provided to be superposed on a signal wiring 102.
Figure 19:
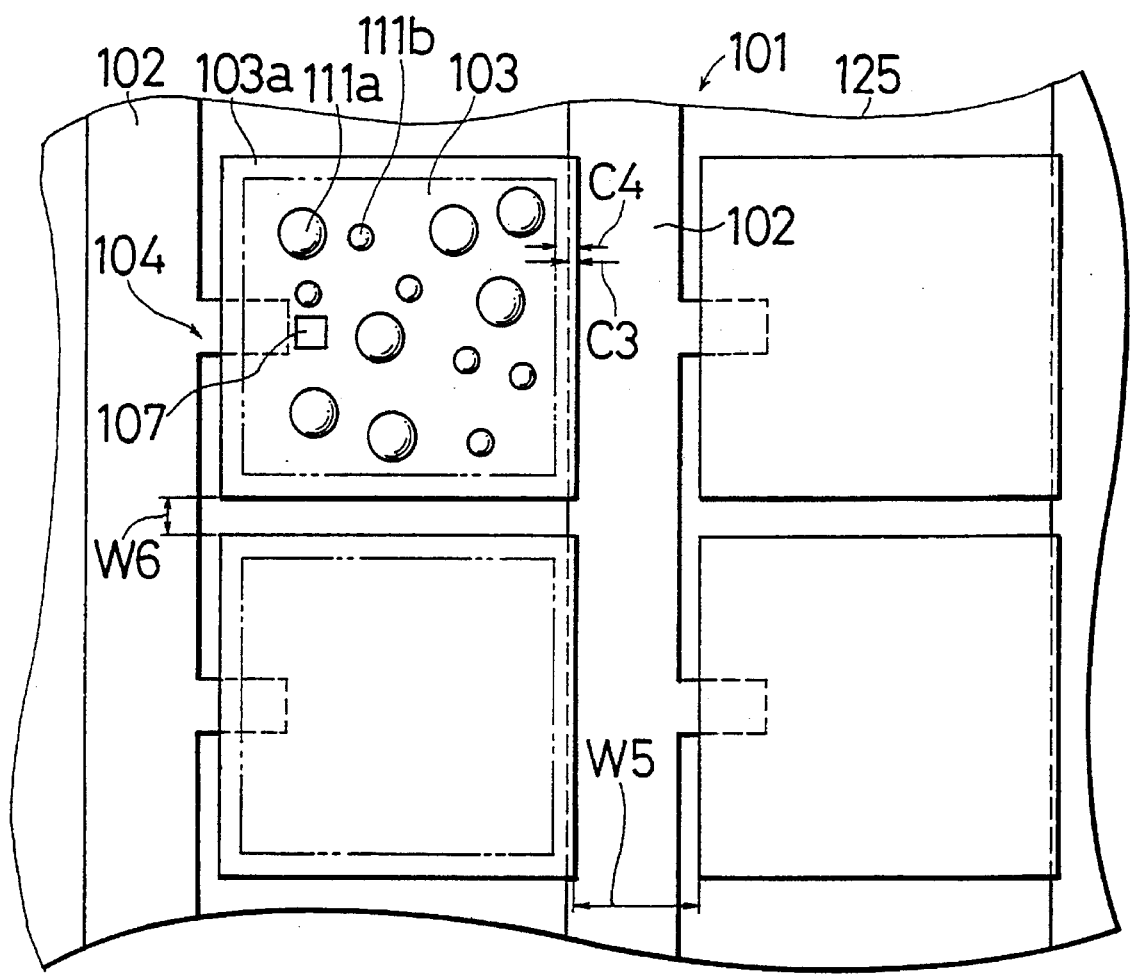
FIG. 19 is a plan view of the other substrate 101 of a pair of substrates in which a reflection electrode 103 is provided to be superposed on a signal wiring 102.

FIGS. 18, 19 are plan views of one substrate 101 of a pair of substrates in which the reflection electrode 103 is formed to be superposed on the signal wiring 102. As shown in FIG. 18, when a length C1 in a direction vertical to the longitudinal direction of the signal wiring 102 is selected to be a relatively large value in the portion where the signal wiring 102 and the reflection wiring 103 overlap each other, the boundary (indicated by an alternate long and two short dashes line in FIG. 18) between the peripheral portion 103a of the reflection electrode 103 and the other portion is selected to be found at a position of the signal wiring 102 having a dimension C2 (<C1) from the edge of the reflection electrode 103 to the inside of the signal wiring 102. For example, when the dimension C1 is 2 μm, the dimension C2 is selected to be 0.5 μm.

As shown in FIG. 19, when a dimension C3 in a direction perpedicular to the longitudinal direction of the signal wiring 102 is selected to be a relatively small value in the portion where the signal wiring 102 and the reflection wiring 103 overlap each other, a region having a dimension C4 (>C3) from the periphery to the inside of the reflection electrode 103 is employed as the peripheral portion 103a. For example, when the dimension C3 is 0.1 μm, the dimension C4 is selected to be 0.5 μm.

Additionally the adjacent reflection electrodes 103 are formed at intervals W5, W6. The interval between the reflection electrodes 103 in a direction perpendicular to the longitudinal direction of the signal wiring 102 is selected to be W5 and the interval between the reflection electrodes 103 in a direction parallel to the longitudinal direction of the signal wiring 102 is selected to be W6.

Figure 20:
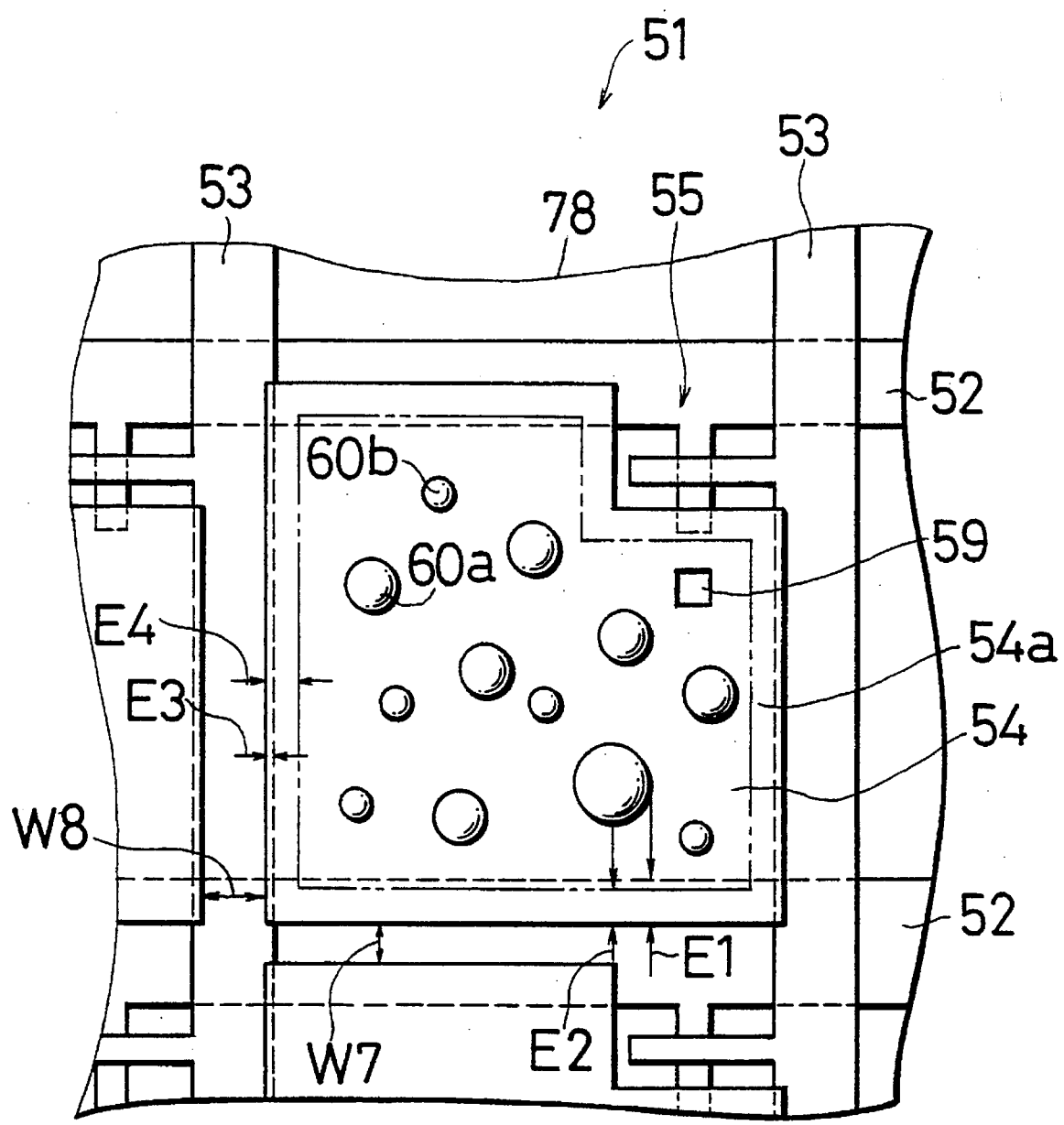
FIG. 20 is a plan view of one substrate 51 of a pair of substrates in which a reflection electrode 54 is provided to be superposed on a gate bus wiring 52 and a source bus wiring 53.
Figure 21:
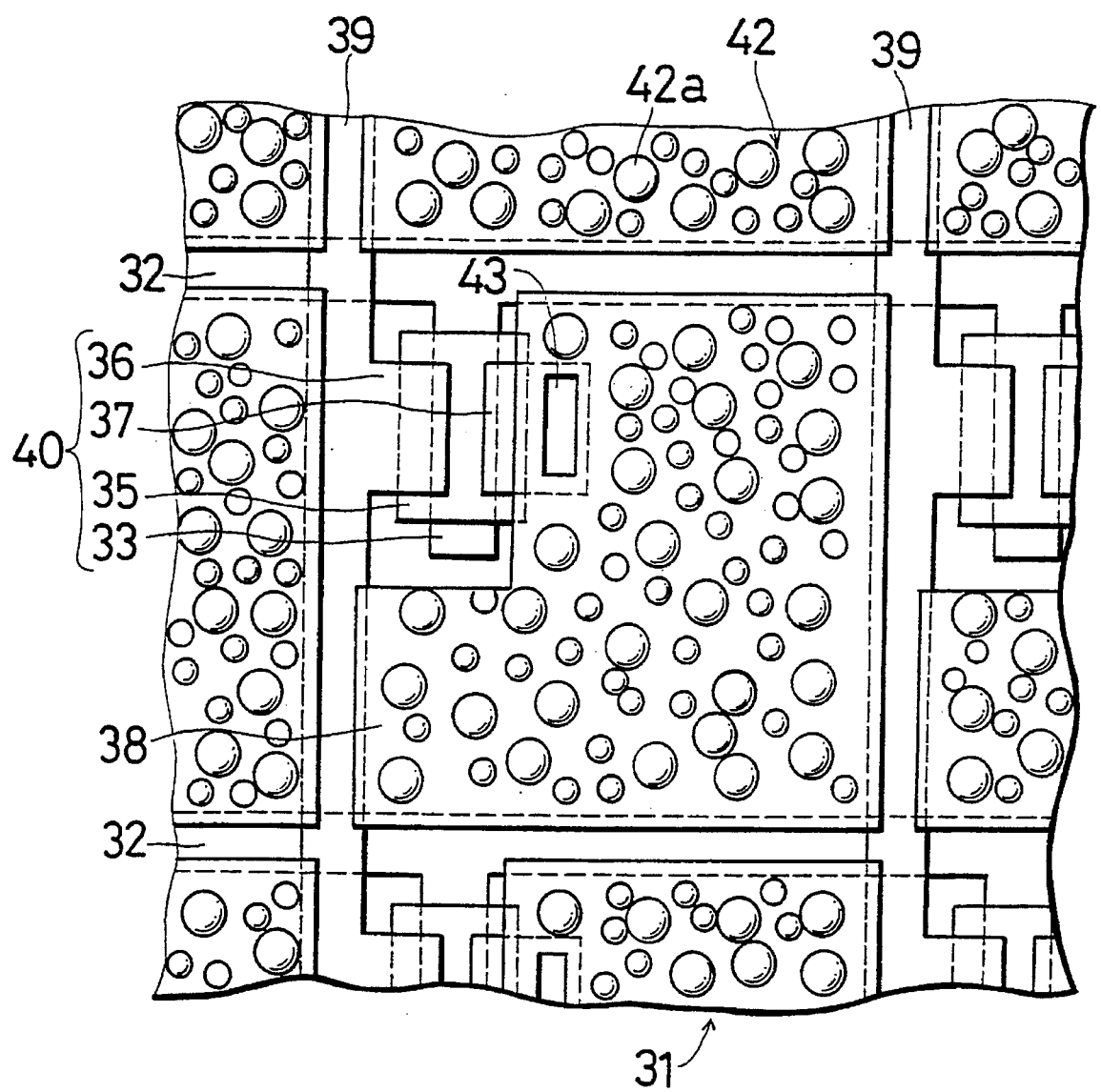
FIG. 21 is a plan view of one substrate 31 of a pair of substrates of a conventional reflection-type liquid crystal display device 30.
Figure 22:
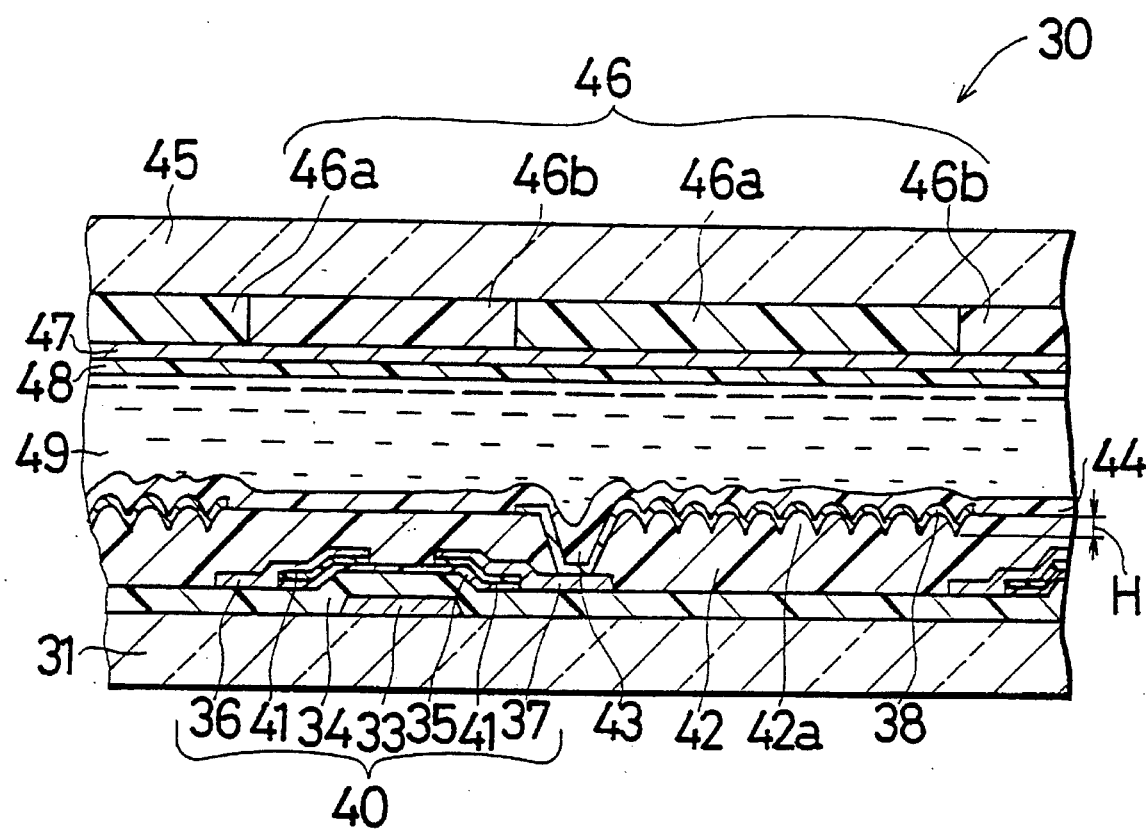
FIG. 22 is a sectional view of the reflection-type liquid crystal display device 30.
Figure 23:
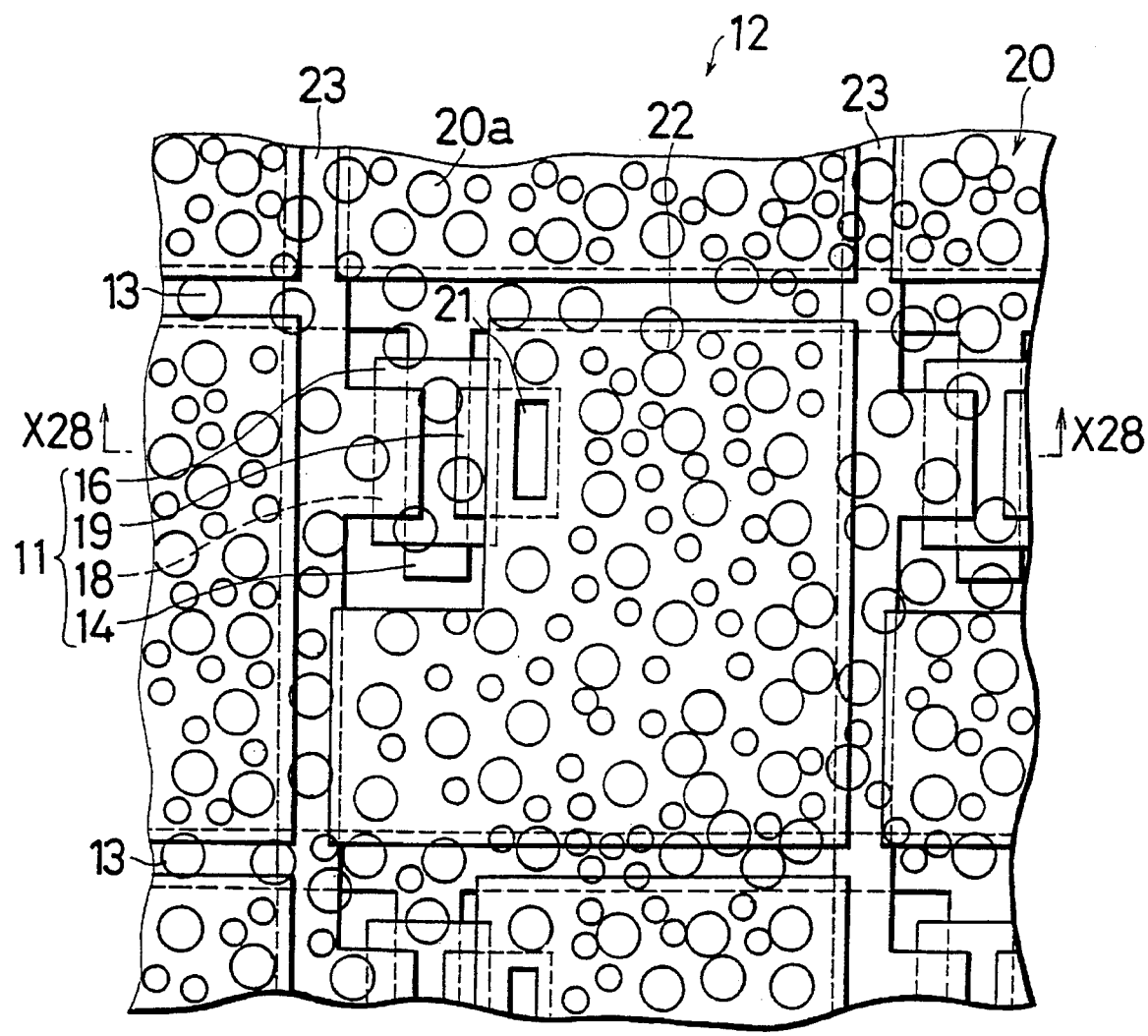
FIG. 23 is a plan view of a substrate 12 comprising TFT 11 which is used in an active matrix type of still other embodiment.
Figure 24:
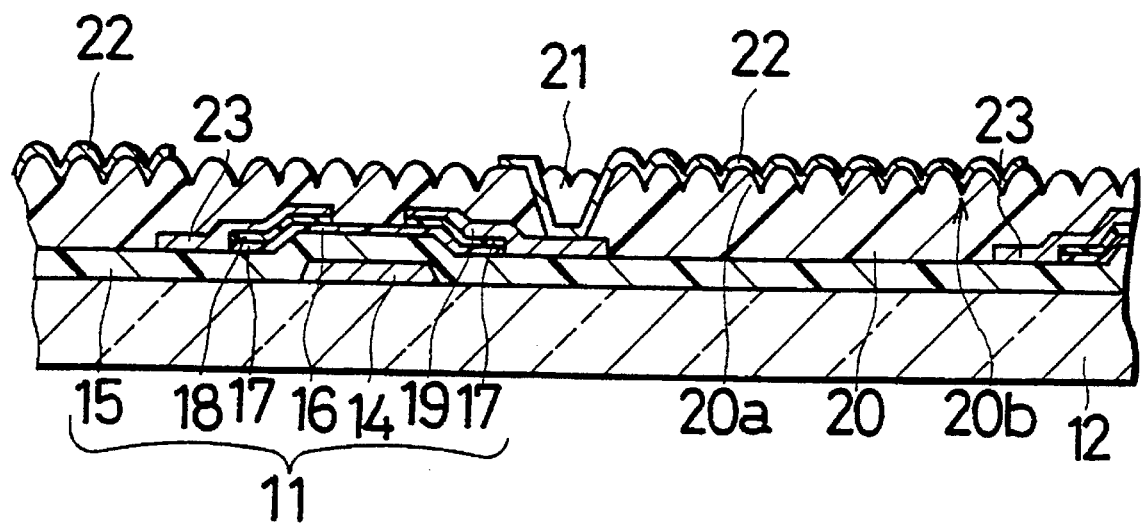
FIG. 24 is a sectional view of the substrate 12 taken on line X28—X28 of FIG. 16.

FIG. 20 is a plan view of one substrate 51 of a pair of substrates in which the reflection electrode 54 is provided to be superposed on the gate bus wiring 52 and the source bus wiring 53. When, for example, in the portion where the gate bus wiring 52 and the reflection electrode 54 overlap each other, a dimension E1 in a direction perpendicular to the longitudinal direction of the gate bus wiring 52 is selected to be a relatively large value, a region having a dimension E2 (<E1) from the periphery to the inside of the reflection electrode 54 is considered as the peripheral portion (54a). For example, when E1 is 0.3 μm, E2 is selected to be 0.5 μm.

On the other hand, when, for example, in the portion where the source bus wiring 53 and the reflection electrode 54 overlap each other, a dimension E3 in a direction perpendicular to the longitudinal direction of the source bus wiring 53 is selected to be a relatively small value, a region having a dimension E4 (>E3) from the periphery to the inside of the reflection electrode 54 is considered as the peripheral portion 54a. For example, when E3 is 0.2 μm, E4 is selected to be 0.5 μm.

Additionally, the adjacent reflection electrodes 54 are formed at intervals W7, W8. The interval between the reflection electrodes 54 in a direction parallel to the longitudinal direction of the source bus wiring 53 is selected to be W7 and the interval between the reflection electrodes 54 in a direction parallel to the longitudinal direction of the source bus wiring 52 is selected to be W8.

What is claimed is:

1. A reflection-type liquid crystal display device comprising:

a liquid crystal layer, and a pair of substrates, said liquid crystal layer being interposed between the pair of substrates, said pair of substrates being disposed opposite to each other, one of the pair of substrates having a light transmitting electrode on the liquid crystal layer side surface thereof, the substrate being light-transmitting, the other of the pair of substrates having a reflection electrode on the liquid crystal layer side surface which reflects light entering from the side of the other of the pair of substrates, and wherein the reflection electrode has a bumpy surface including bumps or dents, and wherein the reflection electrode is rectangular or nearly rectangular, and the ratio of (i) the dimension of a peripheral portion on each side of the reflection electrode in a direction from the surface edge toward the inside of the reflection electrode to (ii) the dimension of the reflection electrode extending in the same direction is selected to be in the range of 0.3 to 10%, and wherein the quantity of bumps or dents in the peripheral portions is less than the quantity of bumps or dents in the remaining portion of the reflection electrode, the ratio of the area excluding bumps or dents in the peripheral portions of the reflection electrode to the entirety of the peripheral portions including bumps or dents being selected to be in the range of 60% to 100%.

2. A reflection-type liquid crystal display device comprising:

a liquid crystal layer, and a pair of substrates, said liquid crystal layer being interposed between the pair of substrates, said pair of substrates being disposed opposite to each other, and one of the pair of substrates having a light-transmitting common electrode covering almost all of the liquid crystal layer side surface thereof on a the liquid crystal layer side surface, the substrate being light-transmitting, the other of the pair of substrates having, on the liquid crystal layer side surface, a plurality of reflection electrodes as picture elements which reflect light entering from the side of the other of the pair of substrates, a distribution electrode which is supplied with a voltage for displaying to be applied to each reflection electrode and a plurality of switching elements for supplying/interrupting the voltage from the distribution electrode to each reflection electrode, and wherein each reflection electrode has a bumpy surface including bumps or dents, and wherein each reflection electrode is rectangular or nearly rectangular and the ratio of (i) the dimension of a peripheral portion on each side of each reflection electrode in a direction from the surface edge toward the inside of said each reflection electrode to (ii) the dimension of said each reflection electrode extending in the same direction is selected to be in the range of 0.3 to 10%, and wherein the quantity of bumps or dents in the peripheral portions of each reflection electrode is less than the quantity of bumps or dents in the remaining portion of each reflection electrode, the ratio of the area excluding bumps or dents in the peripheral portion of each reflection electrode to the entirety of the peripheral portions of each reflection electrode including bumps or dents being selected to be in the range of 60% to 100%.

3. The device of claim 2, wherein each reflection electrode and distribution electrode are formed on the surface of one substrate on the liquid crystal layer side with an interval for maintaining insulation therebetween.

4. The device of claim 1 or 2, wherein the bumps or dents are irregularly arranged.

5. The device of claim 4, wherein the bumps or dents have one type of shape or two or more types of shape differing in size.

6. The device of claim 4, wherein the arrangement pattern of the bumps or dents is selected to be identical in each reflection electrode.

7. The device of claim 4, wherein the arrangement patterns of the bumps or dents in an adjacent pair of reflection electrodes are selected to be a mirror image to each other.

8. The device of claim 4, wherein the arrangement of patterns of the bumps or dents is selected to be radially symmetric around a point located in the center of four adjacent reflection electrodes.

9. A reflection-type liquid crystal display device comprising:

a liquid crystal layer, and a pair of substrates, said liquid crystal layer being interposed between the pair of substrates, said pair of substrates being disposed opposite to each other, one of the pair of substrates having a light transmitting electrode on the liquid crystal layer side surface thereof, the substrate being light-transmitting, the other of the pair of substrates having a reflection electrode on the liquid crystal layer side surface which reflects light entering from the side of the other of the pair of substrates, the reflection electrode being formed such that it is spaced from a source bus wiring and from a gate bus wiring to maintain insulation of the reflection electrode from the source bus wiring and the gate bus wiring, and wherein the reflection electrode has a bumpy surface including bumps or dents, and a periphery not overlapping with the source bus wiring and the gate bus wiring, wherein the quantity of bumps or dents in the periphery is less than the quantity of bumps or dents in the remaining portion of the reflection electrode, and wherein the ratio of the area excluding bumps or dents in the periphery of the reflection electrode to the entirety of the periphery including bumps or dents is selected to be in the range of 60% to 100%.

10. A reflection-type liquid crystal display device comprising:

a liquid crystal layer, and a pair of substrates, said liquid crystal layer being interposed between the pair of substrates, said pair of substrates being disposed opposite to each other, and one of the pair of substrates having a light-transmitting common electrode covering almost all of the liquid crystal layer side surface thereof on a the liquid crystal layer side surface, the substrate being light-transmitting, the other of the pair of substrates having, on the liquid crystal layer side surface, a plurality of reflection electrodes as picture elements which reflect light entering from the side of the other of the pair of substrates, a distribution electrode which is supplied with a voltage for displaying to be applied to each reflection electrode and a plurality of switching elements for supplying/interrupting the voltage from the distribution electrode to each reflection electrode, each reflection electrode being formed such that it is spaced from a source bus wiring and from a gate bus wiring to maintain insulation of the reflection electrode from the source bus wiring and the gate bus wiring, and wherein each reflection electrode has a bumpy surface including bumps or dents and a periphery not overlapping with the source bus wiring and the gate bus wiring, wherein the quantity of bumps or dents in the periphery of each reflection electrode is less than the quantity of bumps or dents in the remaining portion of each reflection electrode, and wherein the ratio of the area excluding bumps or dents in the periphery of each reflection electrode to the entirety of the periphery of each reflection electrode including bumps or dents is selected to be in the range of 60% to 100%.

11. The device of claim 9 or 10, wherein each reflection electrode is rectangular or nearly rectangular, and the ratio of (i) the width of the peripheral portion on each side of the reflection electrode to (ii) the dimension of the reflection electrode extending in a direction perpendicular to that side is selected to be in the range of 0.3 to 10%.

* * * * *